United States Patent
Akl et al.

(10) Patent No.: US 12,108,473 B2
(45) Date of Patent: Oct. 1, 2024

(54) MODES OF SIMULTANEOUS CONNECTIVITY IN INTEGRATED ACCESS AND BACKHAUL

(71) Applicant: QUALCOMM Incorporated, San Diego, CA (US)

(72) Inventors: Naeem Akl, Somerville, NJ (US); Karl Georg Hampel, Jersey City, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/645,625

(22) Filed: Dec. 22, 2021

(65) Prior Publication Data
US 2022/0225451 A1    Jul. 14, 2022

Related U.S. Application Data

(60) Provisional application No. 63/137,699, filed on Jan. 14, 2021.

(51) Int. Cl.
*H04W 76/15* (2018.01)
(52) U.S. Cl.
CPC .................................. *H04W 76/15* (2018.02)
(58) Field of Classification Search
CPC . H04W 76/15; H04W 84/047; H04W 88/085; H04W 92/20; H04W 48/20;
(Continued)

(56) References Cited

U.S. PATENT DOCUMENTS 11,425,620 B1 *  8/2022  Marupaduga ......... H04W 40/22
2022/0263797 A1 *  8/2022  Liu ....................... H04W 36/18
(Continued)

FOREIGN PATENT DOCUMENTS

WO    WO-2022082601 A1 *  4/2022  ........ H04W 36/0005

OTHER PUBLICATIONS

Huawei, et al., "Consideration of Topology Adaptation Enhancement for R17-IAB", 3GPP Draft, 3GPP TSG-RAN WG2 Meeting #112-e, 3rd Generation Partnership Project (3GPP), Mobile Competence Centre, 650, Route Des Lucioles, F-06921 Sophia-Antipolis Cedex, France, vol. RAN WG2, No. Online, Nov. 2-Nov. 13, 2020, Oct. 23, 2020 (Oct. 23, 2020), XP051942568, 11 Pages, Retrieved from the Internet: URL: https://ftp.3gpp.org/tsg_ran/WG2_RL2/TSGR2_112-e/Docs/R2-2009652.zip, R2-2009652 [Retrieved on Oct. 23, 2020] The Whole Document.

(Continued)

*Primary Examiner* — Sudesh M Patidar
(74) *Attorney, Agent, or Firm* — Procopio, Cory, Hargreaves & Savitch LLP

(57) ABSTRACT

A first base station may establish a first connection with an IAB node and transmit, to a second base station, a request for the second base station to establish a second connection with the IAB node. The first base station may indicate to the second base station, based on the second connection being established with the IAB node, that at least one of a first base station or the second base station is to serve as an IAB donor for the IAB node. The second base station may accept or reject the indication received from the first base station that the at least one of the first base station or the second base station is to serve as the IAB donor for the IAB node.

30 Claims, 19 Drawing Sheets

(58) Field of Classification Search
CPC ......... H04W 76/10; H04W 8/24; H04W 8/22; H04W 56/0045; H04W 56/004; H04W 72/0473; H04W 72/044; H04W 72/10; H04W 72/04; H04W 72/14; H04W 72/12; H04W 72/1268; H04W 72/1263; H04W 88/06; H04W 88/02; H04W 52/346; H04W 52/34; H04W 52/36; H04W 52/367; H04W 52/146

See application file for complete search history.

(56) References Cited

U.S. PATENT DOCUMENTS

| | | | | |
|---|---|---|---|---|
| 2023/0199885 A1* | 6/2023 | Diao | | H04W 76/15 |
| | | | | 370/329 |
| 2023/0284246 A1* | 9/2023 | Xu | | H04W 28/08 |
| | | | | 455/509 |
| 2023/0319554 A1* | 10/2023 | Guo | | H04L 45/80 |
| 2023/0362745 A1* | 11/2023 | Huang | | H04W 40/22 |
| 2023/0397084 A1* | 12/2023 | Shah | | H04W 40/12 |

OTHER PUBLICATIONS

International Search Report and Written Opinion—PCT/US2021/065103—ISA/EPO—Apr. 22, 2022.

SAMSUNG: "Discussion on Inter-Donor Topology Redundancy for IAB", Draft, 3GPP TSG-RAN WG3#110-e, 3rd Generation Partnership Project (3GPP), Mobile Competence Centre, 650, Route Des Lucioles, F-06921 Sophia-Antipolis Cedex, France, vol. RAN WG3, No. Online, Nov. 2-Nov. 12, 2020, Oct. 23, 2020 (Oct. 23, 2020), KP051945593, 4 Pages, Retrieved from the Internet: URL: https://ftp.3gpp.org/tsg_ran/WG3_lu/TSGR3_110-e/Docs/R3-206002.zip, R3-206002 [Retrieved on Oct. 23, 2020] p. 1-p. 4, figures 1-2, the whole document.

ZTE, et al., "Discussion on Infer-Donor IAB Node Migration Procedure", 3GPP Draft, 3GPP TSG-RAN WG3 Meeting #110-e, 3rd Generation Partnership Project (3GPP), Mobile Competence Centre, 650, Route Des Lucioles, F-06921 Sophia-Antipolis Cedex, France, vol. RAN WG3, No. Online, Nov. 2-Nov. 12, 2020, Oct. 23, 2020 (Oct. 23, 2020), XP051945943, 11 Pages, Retrieved from the Internet: URL: https://ftp.3gpp.org/tsg_ran/WG3_lu/TSGR3_110-e/Docs/R3-206559.zip, R3-206559 [Retrieved on Oct. 23, 2020], the Whole Document.

* cited by examiner

MODES OF SIMULTANEOUS CONNECTIVITY IN INTEGRATED ACCESS AND BACKHAUL

CROSS REFERENCE TO RELATED APPLICATION(S)

This application claims the benefit of and priority to U.S. Provisional Application Ser. No. 63/137,699, entitled "Modes of Simultaneous Connectivity in Integrated Access and Backhaul" and filed on Jan. 14, 2021, which is expressly incorporated by reference herein in its entirety.

TECHNICAL FIELD

The present disclosure relates generally to communication systems, and more particularly, to modes of simultaneous connectivity in an integrated access and backhaul (IAB) network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be associated with a first base station and configured to establish a first connection with an integrated access and backhaul (IAB) node; transmit, to a second base station, a request for the second base station to establish a second connection with the IAB node; and indicate to the second base station, based on the second connection being established with the IAB node, that at least one of the first base station or the second base station is to serve as an IAB donor for the IAB node.

In an aspect of the disclosure, a method, a computer-readable medium, and an apparatus are provided. The apparatus may be associated with a second base station and configured to receive, from a first base station having a first connection with an IAB node, a request for the second base station to establish a second connection with the IAB node; receive from the first base station, based on the second connection being established with the IAB node, an indication that at least one of the first base station or the second base station is to serve as an IAB donor for the IAB node; and accept or reject the indication received from the first base station that the at least one of the first base station or the second base station is to serve as the IAB donor for the IAB node.

In an aspect of the disclosure, a method, a computer-readable medium, and an apparatus are provided. The apparatus may be associated with an IAB node and configured to establish a first connection with a first base station; establish a second connection with a second base station; and receive an indication, from the first base station, indicating that at least one of the first base station or the second base station is to serve as an IAB donor for the IAB node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
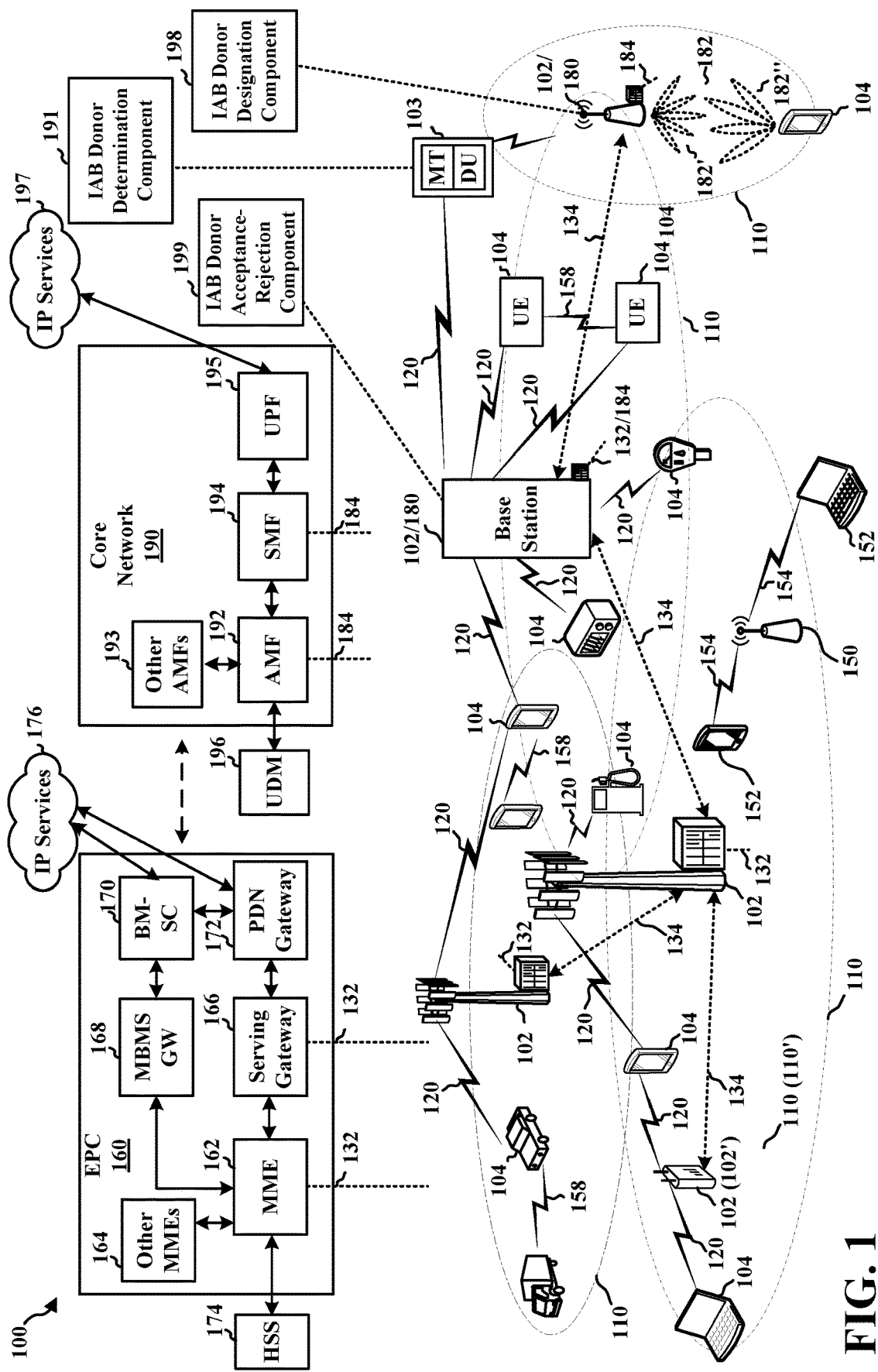
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first base station 102 or 180 may include an integrated access and backhaul (IAB) donor designation component 198 configured to establish a first connection with an IAB node 103; transmit, to a second base station, a request for the second base station to establish a second connection with the IAB node 103; and indicate to the second base station, based on the second connection being established with the IAB node 103, that at least one of a first base station or the second base station is to serve as an IAB donor for the IAB node 103. In certain aspects, a second base station 102 or 180 may include an IAB donor acceptance-rejection component 199 configured to receive, from a first base station 102 or 180 having a first connection with the IAB node 103, a request for a second base station 102 or 180 to establish a second connection with the IAB node 103; receive from the first base station, based on the second connection being established with the IAB node 103, an indication that at least one of the first base station or the second base station is to serve as an IAB donor for the IAB node 103; and accept or reject the indication received from the first base station that the at least one of the first base station or the second base station is to serve as the IAB donor for the IAB node 103. In certain aspects, the IAB node 103 may include an IAB donor determination component 191 configured to establish a first connection with a first base station 102 or 180; establish a second connection with a second base station 102 or 180; and receive an indication, from the first base station, indicating that at least one of the first base station or the second base station is to serve as an IAB donor for an IAB node 103. Although the following description may be focused on 5G NR, the concepts described herein may be applicable to other similar areas, such as LTE, LTE-A, CDMA, GSM, and other wireless technologies.

Figure 2:
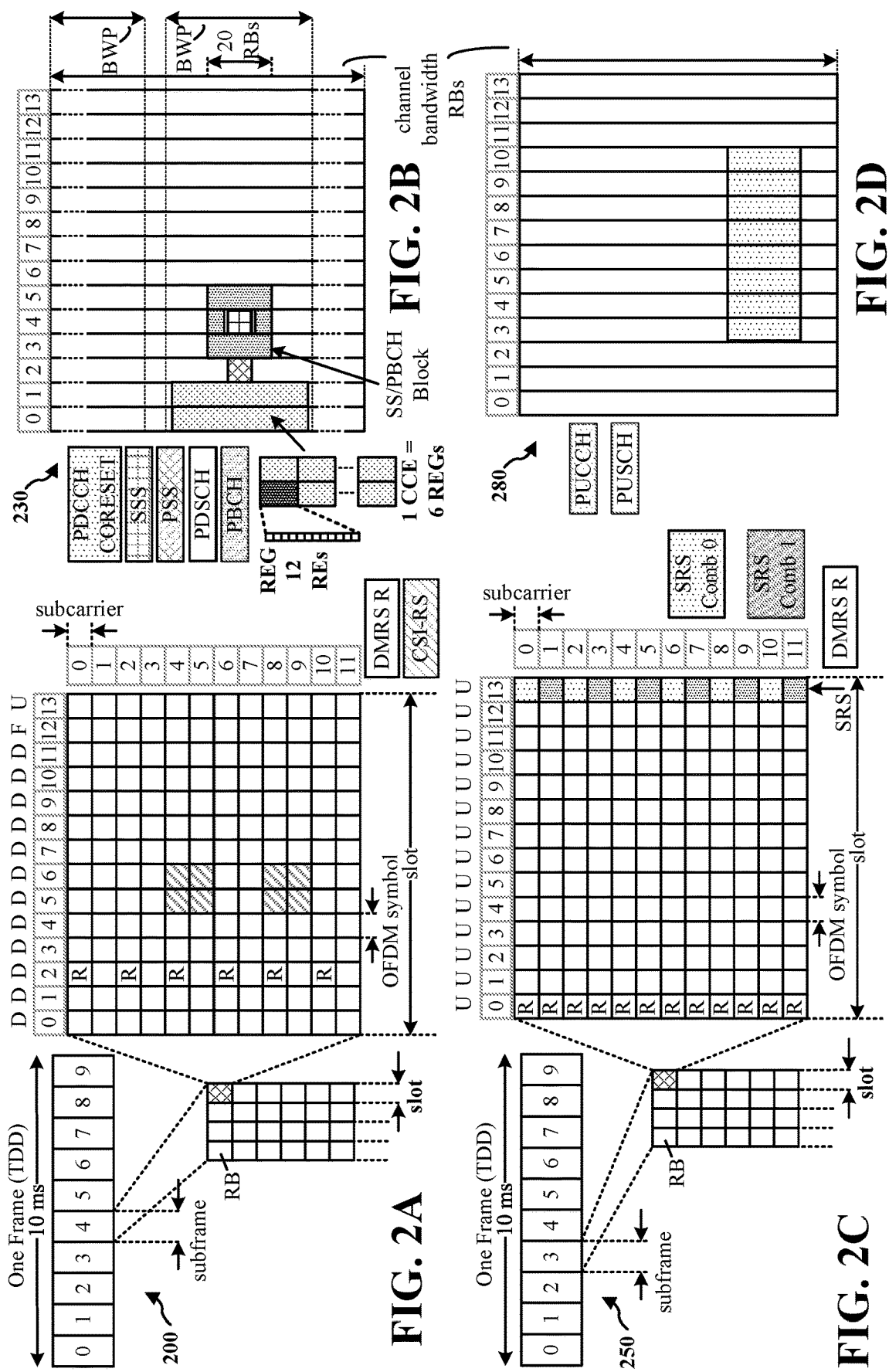
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
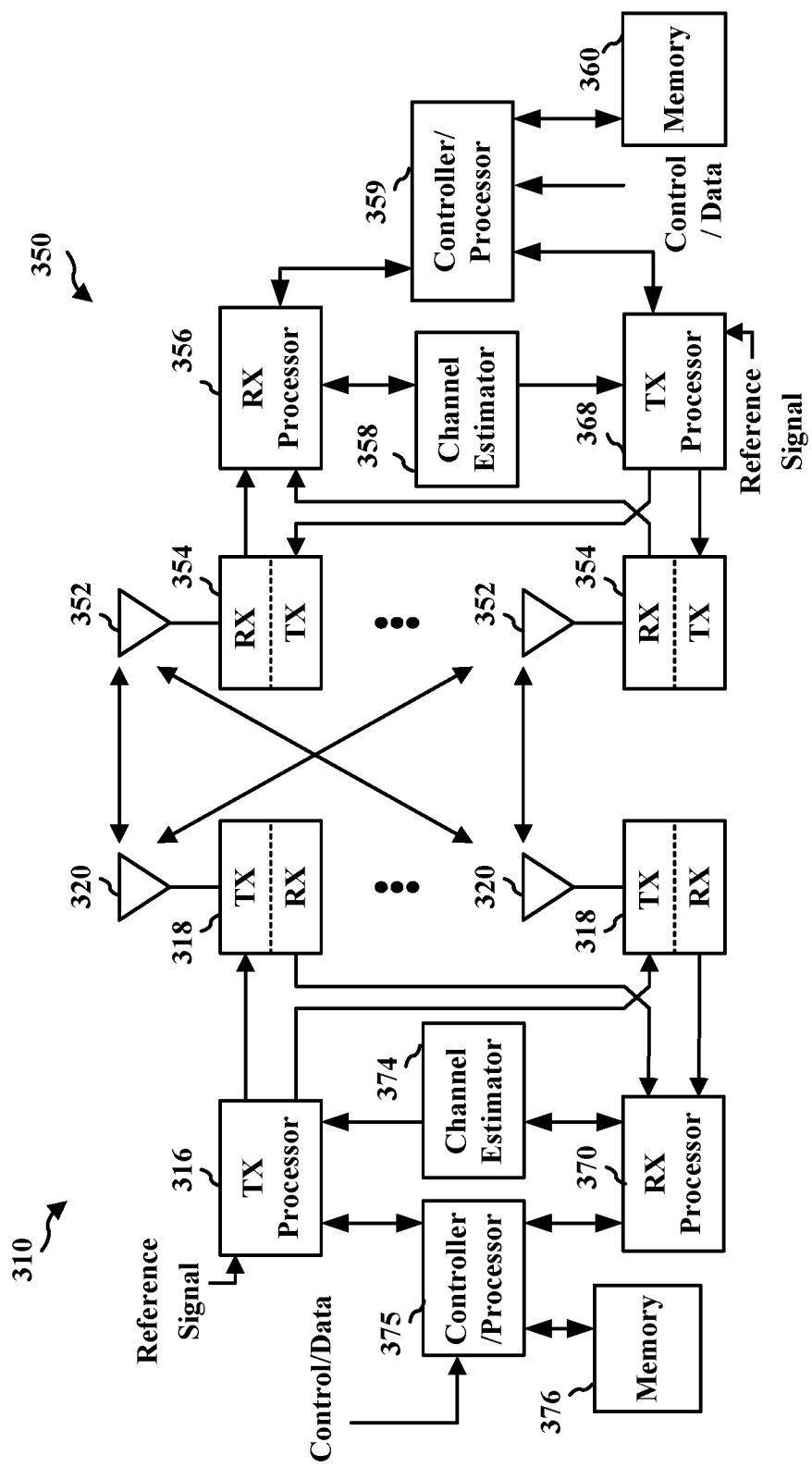
FIG. 3 is a diagram illustrating an example of a base station and user equipment (UE) in an access network.

FIG. 3 is a block diagram of a first wireless device 310 in communication with a second wireless device 350 in an access network. In some examples, the first wireless device may be base station and the second wireless device may be a UE. In other examples, the first wireless device 310 may be a base station and the second wireless device 350 may be a second base station. In some examples, the first wireless device 310 may be a base station and the second wireless device may be an IAB node. In some examples, the first wireless device 310 may be an IAB node and the second wireless device 350 may be a UE.

In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the second wireless device 350. Each spatial stream may then be provided to a different antenna 320 via a separate transmitter 318 TX. Each transmitter 318 TX may modulate an RF carrier with a respective spatial stream for transmission.

At the second wireless device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the second wireless device 350. If multiple spatial streams are destined for the second wireless device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless device 310. These soft decisions may be based on channel estimates computed by the channel estimator 358. The soft decisions are then decoded and deinterleaved to recover the data and control signals that were originally transmitted by the first wireless device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the first wireless device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the first wireless device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the first wireless device 310 in a manner similar to that described in connection with the receiver function at the second wireless device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the second wireless device 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the IAB donor designation component 198 of FIG. 1.

At least one of the TX processor 316, the RX processor 370, and the controller/processor 375 may be configured to perform aspects in connection with the IAB donor acceptance-rejection component 199 of FIG. 1.

At least one of the TX processor 316, the RX processor 370, and the controller/processor 375 may be configured to perform aspects in connection with the IAB donor determination component 191 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
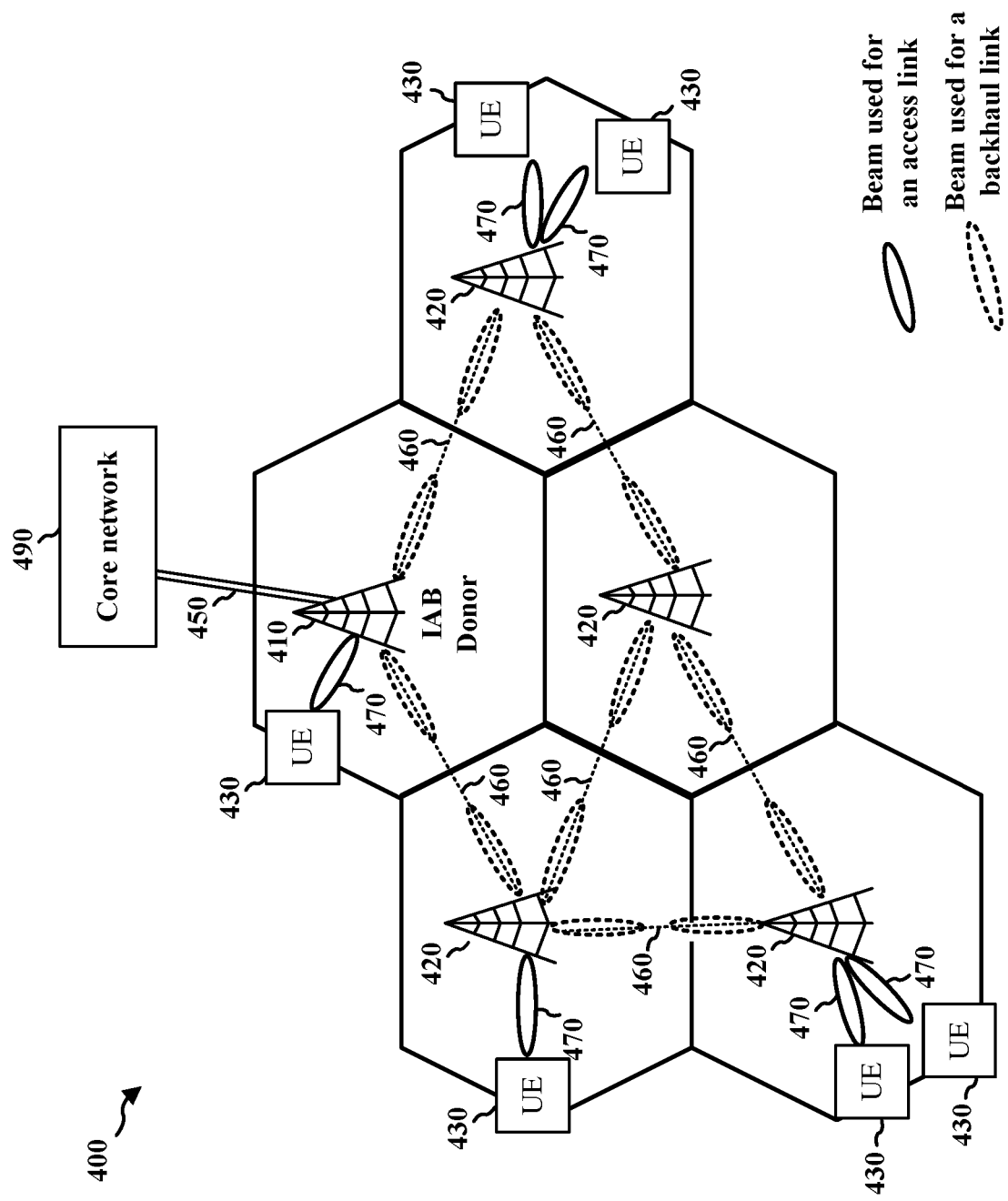
FIG. 4 is a diagram illustrating an integrated access and backhaul (IAB) network.

FIG. 4 is a diagram illustrating an IAB network 400. The IAB network provides access network functionality between access nodes (ANs) and other ANs/UEs, and backhaul network functionality between ANs. The ANs include IAB-donors, which have a wireline connection to a core network 490, and IAB-nodes, which operate wirelessly and relay traffic to/from IAB-donors through one or more AN hops. The IAB ANs share resources between the access and backhaul. That is, the resources used for access communication between the ANs and the ANs/UEs are also used for backhaul communication between the ANs.

The IAB network 400 may include an anchor node, which may be referred to herein as an "IAB donor" 410, and access nodes, which may be referred to herein as "IAB nodes" 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to the core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. The UEs 430 communicate with the core network 490 by relaying messages through their respective access link 470 to the IAB network 400, which then may relay the message through backhaul links 460 to the IAB donor 410 to communicate with the core network 490 through the wireline backhaul link 450. Similarly, the core network 490 may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for the IAB donor 410 or the IAB node 420. The PCI value may be used to determine a scrambling sequence that may be applied to physical signals and/or channels that are transmitted by a particular IAB node. For example, a PSS and/or the SSS transmitted by the respective IAB donor 410 or IAB node 420 may be scrambled using a scrambling sequence that may be based on the PCI used by the respective IAB node.

Figure 5:
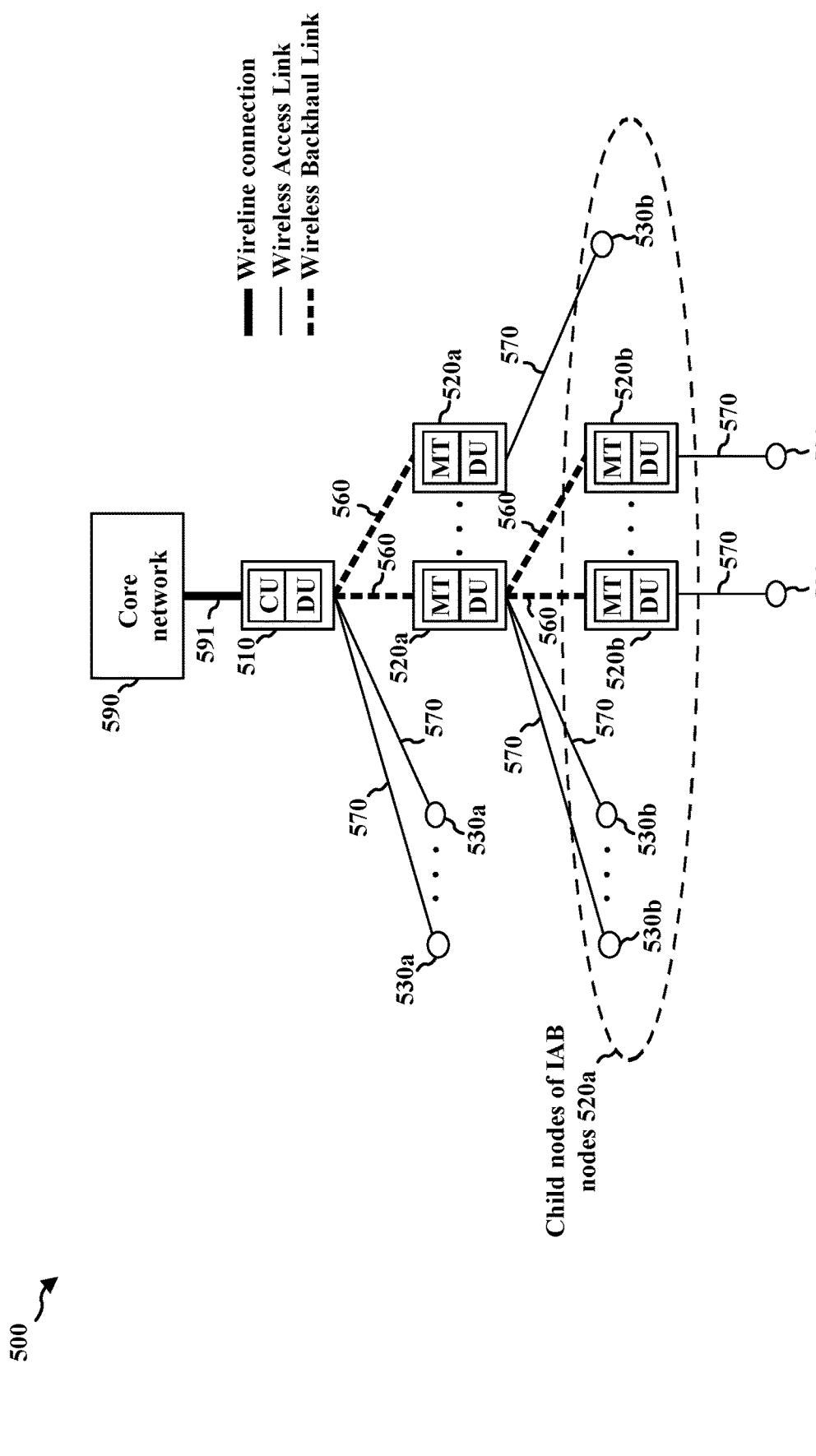
FIG. 5 is a diagram illustrating an IAB network and components thereof.

FIG. 5 is a diagram illustrating an IAB network 500 and components thereof. The IAB network 500 includes an IAB donor node 510 and IAB nodes 520a-520b. The IAB nodes 520a-520b, as well as the IAB donor node 510, may provide wireless access links to UEs 530a-530c.

The IAB donor node 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of the IAB donor node 510. The IAB donor node 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor node 510 may include a central unit (CU) and a distributed unit (DU). The CU may provide control for the IAB nodes 520a, 520b in the IAB network 500. For example, the CU may control the IAB network 500 through configuration. The CU may perform RRC/PDCP layer functions. The IAB donor nodes 510 further include a DU that may perform scheduling. For example, the DU may schedule resources for communication by the child IAB nodes 520a and/or UEs 530a of the IAB donor node 510. The DU is associated with radio link control (RLC), media access control (MAC), and physical (PHY) layer functions.

The IAB nodes 520a, 520b may include a mobile termination (MT) and a DU. The IAB node may be an L2 relay node. The MT of IAB node 520a may operate as a scheduled node that may be scheduled similar to a UE 530a by the DU of the parent node, e.g., IAB donor node 510. The MT of IAB node 520b may operate as a scheduled node of parent node 520a. The DU may schedule the child IAB nodes 520b and UEs 530b of the IAB node 520a. An IAB node may provide a connection to an IAB node that in turn provides another connection for another IAB node. The pattern of a parent IAB node comprising a DU that schedules a child IAB node/child UE may continue to more connections.

Figure 6:
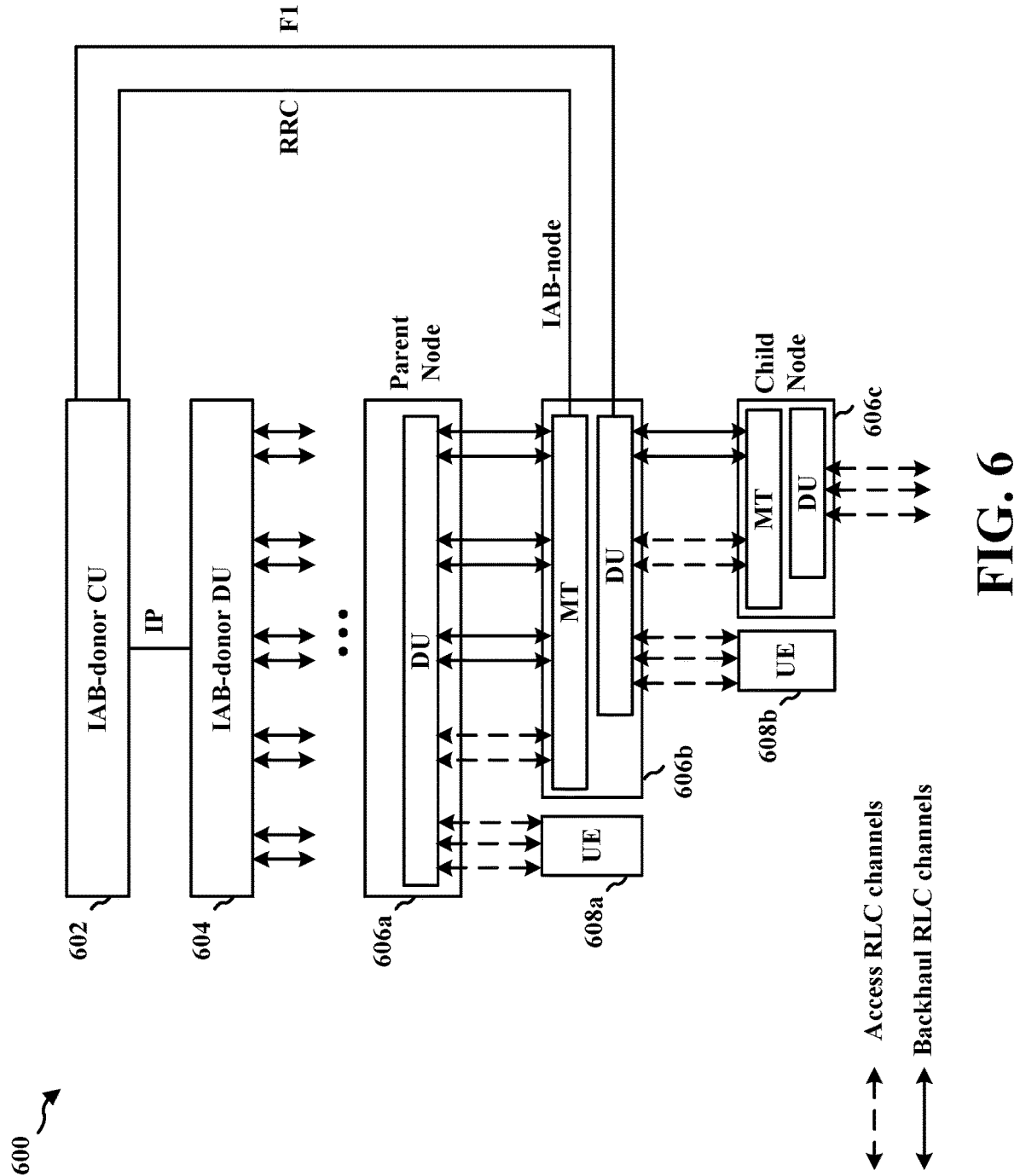
FIG. 6 is a diagram illustrating radio link control (RLC) channels in an IAB network.

FIG. 6 is a diagram 600 illustrating RLC channels in an IAB network. As discussed supra, the IAB network provides both access network functionality and backhaul network functionality. The IAB network includes an IAB donor with a CU 602 and a DU 604. In order to provide access network functionality, IAB nodes 606a, 606b, and 606c may communicate with other UEs 608a and 608b and/or MTs of other IAB ANs through access RLC channels. Thus, the IAB nodes 606a, 606b, and 606c operate as access IAB nodes for their child nodes or UEs. In order to provide backhaul network functionality, IAB nodes 606a, 606b, and 606c may route traffic to other IAB nodes (e.g., 606a, 606b, and 606c) through backhaul RLC channels (BH RLC CHs). Thus, the IAB nodes 606a, 606b, and 606c may operate as intermediate IAB nodes when backhauling traffic for other IAB nodes. Access RLC channels include UE-to-DU/DU-to-UE, carrying PDCP for RRC or data radio bearers (DRBs), and MT-to-DU/DU-to-MT, carrying PDCP for RRC (or DRBs). BH RLC CHs include MT-to-DU/DU-to-MT, carrying backhaul adaptation protocol (BAP) messages for backhauling access traffic.

Figures 7A, 7B:
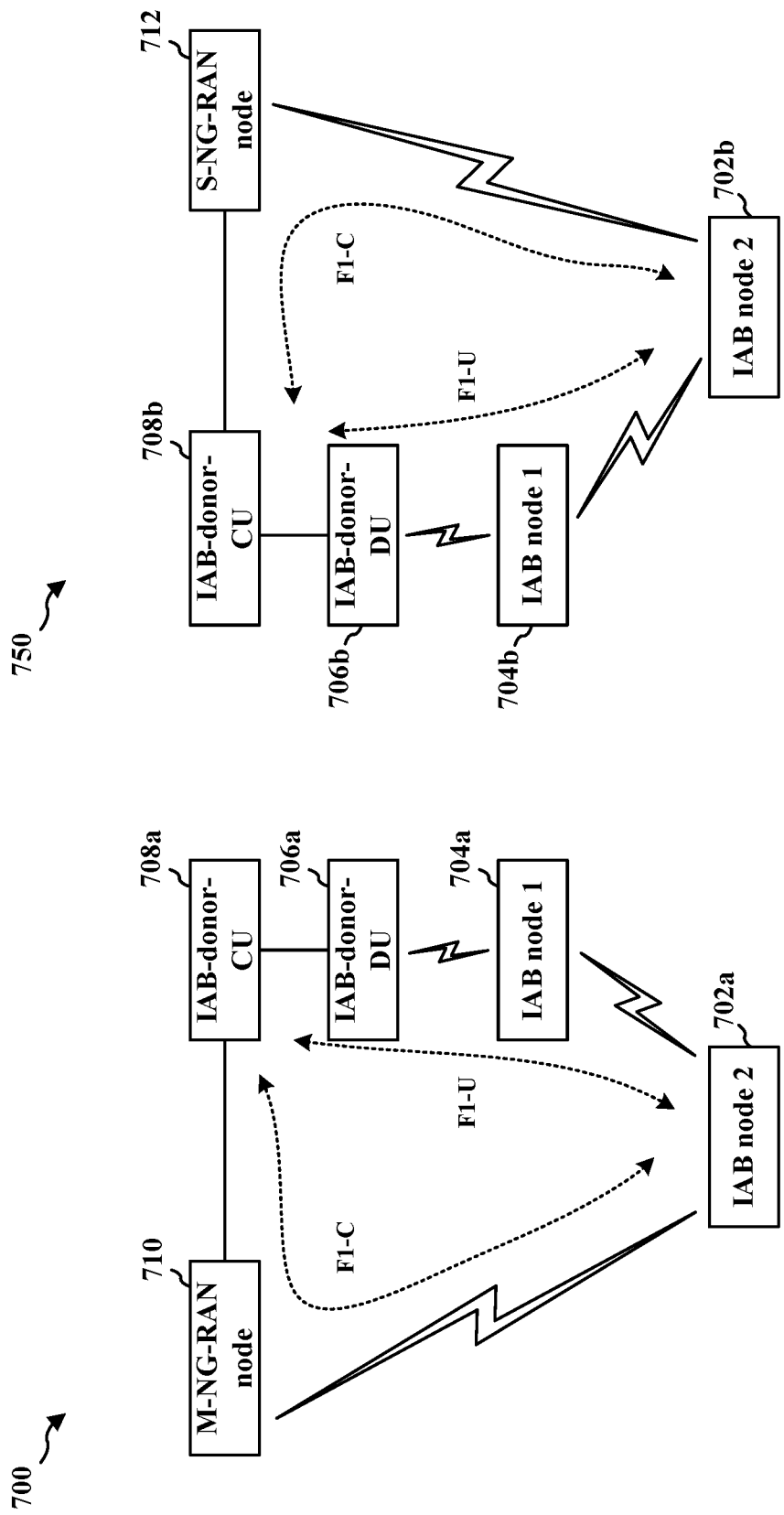
FIGS. 7A-7B illustrate diagrams for control-plane/user-plane (CP-UP) separation.

FIGS. 7A-7B include diagrams 700-750 illustrating control-plane/user-plane (CP-UP) separation based on dual connectivity. In the diagram 700, an F1-control-plane (F1-C) interface between IAB node 2 702a and an IAB-donor-CU 708a may be based on an access link via a primary RAN node (e.g., non-donor node). The primary RAN node may be referred to as a master-NG-RAN (M-NG-RAN) node 710. The F1 user-plane (F1-U) interface between the IAB node 2 702a and the IAB-donor-CU 708a may be based on a backhaul link via IAB node 1 704a and IAB-donor-DU 706a. More specifically, the IAB node 2 702a may be dual connected based on connections to the M-NG-RAN 710 and the IAB node 1 704a. Since an IAB node may have UE-functionality, the IAB node 2 702a may be RRC-connected to both the M-NG-RAN node 710 and the IAB-donor-CU 708a. Dual connectivity may be based on a single physical link or multiple physical links. For example, the IAB node 2 702a may be connected to a secondary node (e.g., IAB-donor-CU 708a) via the master node (e.g., M-NG-RAN 710) without a physical link between the IAB node 2 and the master node, or the IAB node 2 702a may be connected to the master node and the secondary node based on physical links between each of the nodes.

Different connections between nodes via the F1 interface may provide different levels of coverage robustness for the control-plane (c-plane) or different levels of capacity for the user-plane (u-plane). Robust coverage may be associated with the sub-6 GHz frequency band, as such signals may be less affected by attenuation than signals based on the millimeter wave (mmW) frequency band. For example, the M-NG-RAN node 710 may be a base station that serves one or more child nodes via sub-6 GHz signals, which may have robust coverage that allows the M-NG-RAN node 710 to communicate with a child node in a single hop. In contrast, mmW signals, which may be affected by attenuation, may not be used to communicate over as large of a physical distance as sub-6 GHz signals. Thus, multiple hops may be performed between the IAB node 2 702a and the IAB-donor-CU 708a, e.g., via the IAB node 1 704a and the IAB-donor-DU 706a. However, mmW signals may be associated with large bands of frequencies, which may be utilized to provide increased capacity over sub-6 GHz signals.

In configurations, the IAB node 2 702 may be connected to a first base station via sub-6 GHz signaling and connected to a second base station via mmW signaling. For example, F1 signaling may be split at the IAB node 2 702a such that an access link may be used for the c-plane and a backhaul link may be used for the u-plane. A difference between a base station (e.g., M-NG-RAN 710) and an IAB donor (e.g., IAB-donor-CU 708a) may be that the IAB donor is a base station that is configured to support IAB functionality. If the M-NG-RAN node 710 is a base station that does not support/assert IAB functionality, the F1-U connection for the DU of the IAB node 2 702a may utilize multiple hops on the backhaul link via mmW signaling, whereas the F1-C connection may utilize an RRC connection of the MT of the IAB node 2 702a for transmitting containers to the IAB-donor-CU 708a via the M-NG-RAN 710.

In the diagram 750, the F1-C interface between IAB node 2 702b and IAB-donor-CU 708b may be based on an access link via a secondary-NG-RAN (S-NG-RAN) node 712 (e.g., non-donor node), and the F1-U interface between the IAB node 2 702b and the IAB-donor-CU 708b may be based on a backhaul link via IAB node 1 704b and IAB-donor-DU 706b. In examples, the IAB-donor-CU 708b may be a master node that may receive a container over the F1-C interface in a single hop via the S-NG-RAN node 712. The single hop of the F1-C interface may provide robust coverage, whereas the F1-U interface may be associated with multiple hops but may provide increased capacity.

Accordingly, in the diagram 700, the F1-C interface may be based on use of the access link to communicate with the secondary node and the F1-U interface may be based on use of the backhaul link to communicate with the secondary node, where the master node (e.g., M-NG-RAN 710) may be a non-donor node and the secondary node (e.g., IAB-donor-CU 708a) may be a donor node. Alternatively, in the diagram 750, the F1-C interface may be based on use of the backhaul link to communicate with the master node and the F1-U interface may be based on use of the access link to communicate with the master node, where the secondary node (e.g., S-NG-RAN 712) may be a non-donor node and the master node (e.g., IAB-donor-CU 708b) may be a donor node. In either case, the access link and/or the backhaul link may be based on either mmW signaling and/or sub-6 GHz signaling. Further, the access link and/or the backhaul link may be based on single hop or multi-hop configurations. A difference between utilizing an access link and a backhaul link for communication is that access link traffic may be carried on access RLC channels, whereas backhaul link traffic may be carried on a BAP via backhaul RLC channels. In the diagrams 700-750, the F1-C connection is routed over an RRC of an access link, while the F1-U connection is routed over a backhaul BAP/IP layer.

Figures 8A, 8B:
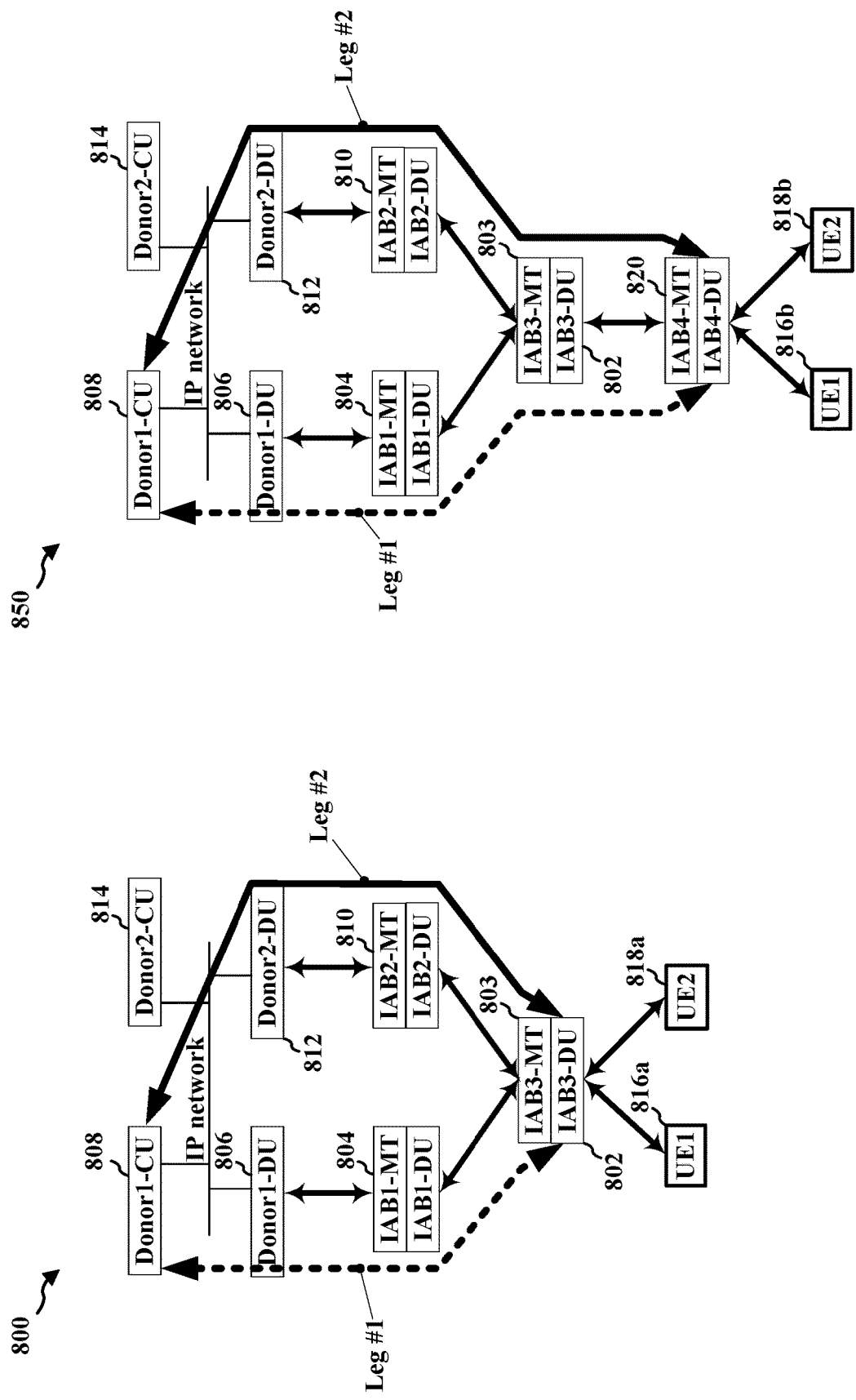
FIGS. 8A-8B illustrate diagrams for inter-donor topological redundancy.

FIGS. 8A-8B include diagrams 800-850 illustrating inter-donor topological redundancy. When an IAB node (e.g., IAB3 node 802-803) is dual connected to two donor nodes (e.g., Donor1-DU 806 and Donor2-DU 812), the backhaul link may include a first leg and a second leg. The first leg may include the IAB3 node 802-803 having an IAB3-MT 803 and an IAB3-DU 802, an IAB1 node 804 having an IAB1-MT and an IAB1-DU, a Donor1-DU 806, and a Donor1-CU 808. The second leg may include the IAB3 node 802-803, an IAB2 node 810 having an IAB2-MT and an IAB2-DU, a Donor2-DU 812, and the Donor1-CU 808.

Accordingly, backhaul information may be transmitted over two paths to provide robustness and load balancing. The inter-donor topological redundancy may be based on the IAB-DU 802 having an F1 interface with a single donor-CU. The IAB3-DU 802 may be connected to the Donor1-CU 808 via an F1 interface, which may be split into the F1-C interface and the F1-U interface. Thus, the IAB3-DU 802 may have an F1 interface that includes two parts. For robustness, the F1-C part of the F1 interface between the IAB3-DU 802 and the Donor1-CU 808 may utilize different paths to transmit F1-C traffic in a more reliable manner between the IAB3-DU 802 and the Donor1-CU 808. For load balancing, the F1-U part of the F1 interface may be utilized to decrease traffic transmitted via a first topology associated with Donor1-CU 808 by sending some of the traffic through a second topology associated with Donor2-CU 814. For example, if the IAB3 node 802-803 that serves a first UE 816a and a second UE 818a initially overloads the first topology by transmitting all of the traffic for the first UE 816a and the second UE 818a over the first topology, the IAB3 node 802-803 may perform load balancing by transmitting further traffic for the second UE 818a over the second topology and continuing to transmit traffic for the first UE 816a over the first topology.

In the diagram 800, the IAB3 node 802-803 may be an access IAB node that serves the first UE 816a and the second UE 818a. In the diagram 850, the IAB3 node 802-803 may be one or more hops away from a first UE 816b and a second UE 818b, which may be served by an IAB4 node 820. The IAB4 node 820 may forward traffic for the first UE 816b and the second UE 818b to the IAB3 node 802-803 to perform the load balancing based on topological redundancy. Thus, the first leg and the second leg of the backhaul link may be extended to further include the IAB4 node 820. Accordingly, a first configuration associated with the diagram 800 may include the IAB3 node 802-803 being dual connected with two donor nodes, and a second configuration associated with the diagram 850 may include the IAB3 node 802-803 being a parent/ancestor node of the IAB4 node 820 and being dual connected with two donor nodes. Both CP-UP separation and topological redundancy may be performed for a dual connected IAB node and an ancestor/descendant IAB node of the dual connected IAB node.

In an example, the F1-C interface may include multiple hops and the F1-U interface may include a single hop. However, neither the access link nor the backhaul link is limited to single hop or multi-hop configurations. For performing CP-UP separation over multiple topologies, the IAB3-MT 803 may connect to Donor1-CU 808 via an access link of the first topology (e.g., communicate F1-C traffic using an access RLC channel of the link between the IAB3-MT 803 and IAB1 804), and the IAB3-MT 803 may connect to the Donor2-CU 814 via a backhaul link of the second topology (e.g., communicate F1-U traffic using a backhaul RLC channel of the link between the IAB3-MT 803 and IAB2 810). Given that CP-UP separation (e.g., such as described in connection with the diagrams 700-750) and topological redundancy techniques (e.g., as described in connection with the diagrams 800-850) may both be performed after the IAB3 node 802-803 becomes dual connected, the IAB3 node 802-803 may have to determine which technique to utilize.

Figures 9A, 9B, 9C:
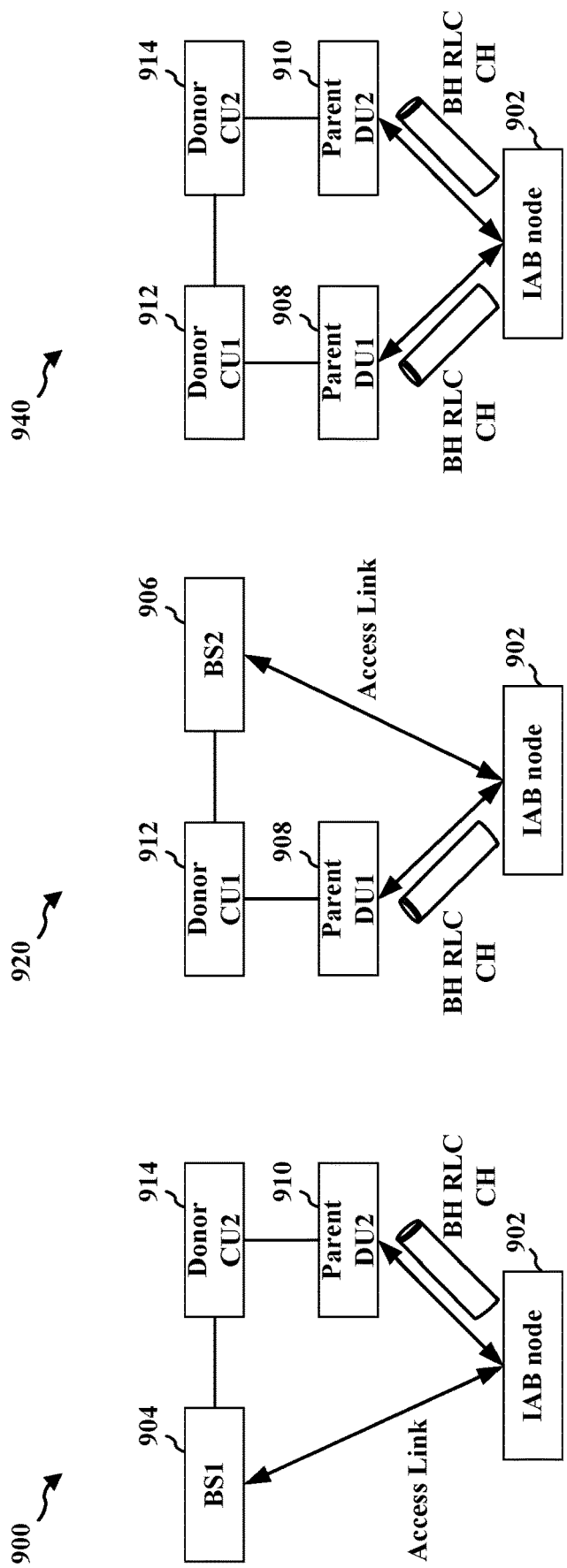
FIGS. 9A-9C illustrate modes of dual connection for an IAB node.

FIGS. 9A-9C illustrate example modes of multi-connectivity that include a dual connection 900, 920, and 940 for an IAB node 902. For example, CP-UP separation via a first mode of dual connection 900 for the IAB node 902 may be performed based on a first base station 904 (e.g., primary node) being a non-donor node and a Donor CU2 914 (e.g., secondary node) being a donor node. CP-UP separation via a second mode of dual connection 920 for the IAB node 902 may be performed based on a Donor CU1 912 (e.g., primary node) being a donor node and a second base station 906 (e.g., secondary node) being a non-donor node. Topological redundancy via a third mode of dual connection 940 for the IAB node 902 may be performed based on the Donor CU1 912 (e.g., primary node) and the Donor CU2 914 (e.g., secondary node) both being donor nodes.

If a base station is not configured to support IAB functionality, the base station may not be a donor node. If the base station is configured to support IAB functionality, but the base station determines to serve the MT of the IAB node 902 as a base station that does not assert the IAB functionality toward the IAB node 902, the base station may likewise not be a donor node. However, if the base station asserts the IAB functionality towards the IAB node 902, the base station may become a donor node. In some configurations, a same base station may be a donor node for a first IAB node and a non-donor node for a second IAB node (e.g., the base station may terminate the RRC connection with the MT of the second IAB node). A backhaul link that includes a BH RLC CH may be based on a single hop or multiple hops.

As any of the Donor CU1 912, the Donor CU2 914, or both, may be base stations that may assert donor functionality toward the IAB node 902, CP-UP separation and topological redundancy procedures may have to be coordinated among the nodes. The IAB node 902 may initially connect to one of the second base station 906 or the Donor CU1 912 (e.g., via a Parent DU1 908), or may connect to the first base station 904 or the Donor CU2 914 (e.g., via a Parent DU2 910) at a first time, and the IAB node 902 may subsequently become connected to the other one of the second base station 906/the Donor CU1 912 or the first base station 904/the Donor CU2 914 at a second time to provide a dual connection. A first node that is initially connected to the IAB node 902 may determine whether CP-UP separation or topological redundancy is to be performed for the IAB node 902.

The first base station 904 may determine whether to become a donor node (e.g., Donor CU1 912) for the IAB node 902 or whether to operate as a non-donor node (e.g., first base station 904). When the IAB node 902 connects via a second link to the second base station 906/Donor CU2 914, the first base station 904 may indicate to the second base station 906/Donor CU2 914 whether the first base station 904 intends to operate as donor node (e.g., Donor CU1 912) or a non-donor node (e.g., first base station 904). In cases where an initial base station to connect with the IAB node 902 determines not to perform decision-making procedures, the initially-connected base station may handover the determination to another base station (e.g., the second base station 906) that may accept the decision-making tasks. Such procedures may occur when both the first base station 904 and the second base station 906 are capable of providing donor functionality for the IAB node 902.

The first base station 904/Donor CU1 912 may establish a first signaling connection with the IAB node 902 and may subsequently transmit a request for a second base station 906/Donor CU2 914 to establish a second signaling connection between the IAB node 902 and the second base station 906/Donor CU2 914, where the second signaling connection may be maintained simultaneously with the first signaling connection. The second base station 906/Donor CU2 914 may receive the request from the first base station 904/Donor CU1 912 that has established the first signaling connection with the IAB node 902 to establish the second signaling connection between the IAB node 902 and the second base station 906/Donor CU2 914. Based on the simultaneous connections, the IAB node 902 may be dual connected such that the first base station 904/Donor CU1 912 and the second base station 906/Donor CU2 914 may coordinate with each other to determine whether the first base station 904/Donor CU1 912 and/or the second base station 906/Donor CU2 914 are to assert donor functionality toward the IAB node 902.

The first signaling connection may be an RRC connection or an F1-C connection. The second signaling connection may also be an RRC connection or an F1-C connection. More specifically, the IAB node 902 may include the MT for the RRC connection and the DU for the F1-C connection. If the IAB node 902 has F1-C connections with both the first base station 904 and the second base station 906, multiple logical IAB-DUs may be provided at the IAB node 902 in association with the different CUs of the first base station 904 and the second base station 906. If one of the first base station 904 or the second base station 906 configures a BH RLC CH at the IAB-MT of the IAB node 902, the one of the first base station 904 or the second base station 906 may be presumed to be an IAB donor for the IAB node 902.

The simultaneous connections of the first base station 904/Donor CU1 912 and the second base station 906/Donor CU2 914 with the IAB node 902 may be based on NR-dual connectivity (NR-DC), multi-radio dual connectivity (MR-DC), dual active protocol stack (DAPS), or multi-MT connectivity. The DAPS may be utilized when a UE is handed over from the first base station 904 to another base station to reduce an interruption time for the UE. However, the UE may still continue to receive signaling from both the first base station and the other base station at the same time (e.g., source base station and target base station), such that a master node and a secondary node may not be designated. Multi-MT connectivity may be utilized when the IAB node 902 includes two MTs, which may allow two UEs to independently connect to different locations, as opposed to an IAB node that includes one MT. In aspects, the second signaling connection with the IAB node 902 may be initiated by the IAB node 902, where the first base station 904 and/or the second base station 906 may serve as an IAB donor (e.g., Donor CU1 912 and/or Donor CU2 914). That is, the first base station 904 and the second base station 906 may support IAB functionality and may or may not become an IAB donor, depending on whether the first base station 904 or the second base station 906 asserts the IAB donor functionality towards the IAB node 902. As described herein, such determinations may be coordinated between the first base station 904 and the second base station 906.

In a first aspect, asserting the IAB donor functionality may include terminating F1 connectivity with the IAB node 902. In a second aspect, asserting the IAB donor functionality may include establishing a BH RLC CH at the IAB node 902, as the BH RLC CH may be used for the IAB node 902 to relay traffic between child nodes and parent nodes (e.g., Parent DU1 908 and Parent DU2 910). An IAB donor may configure a BH RLC CH toward a parent node at an MT of the IAB node (e.g., based on RRC connectivity between the IAB-MT and the IAB-donor-CU). An IAB donor may also configure a BH RLC CH toward a child node at a DU of the IAB node or at an IAB-donor-DU (e.g., based on F1-C connectivity between the IAB-DU/IAB-donor-DU and the IAB-donor-CU). In a third aspect, asserting the IAB donor functionality may include providing a BAP configuration to the IAB node 902. When the IAB node 902 is dual connected, quality of service (QoS) support as well as routing functionality for communicating with a donor node via the connections may be associated with a BAP layer. The IAB donor may configure the BAP layer. In a fourth aspect, asserting the IAB donor functionality may include providing a base station-DU cell resource configuration to the IAB node 902. Because transmission at the DU may cause self-interference at the MT, the CU may provide a cell resource configuration for the IAB node 902 based on a half-duplex (HD) constraint of the IAB node 902. In a fifth aspect, asserting the IAB donor functionality may include providing an IP configuration to the IAB node 902, which may include one or more IP addresses or IP prefixes. For the IAB node 902 to be reachable from the IP network, an IP address may be selected so that when the IAB node 902 communicates with the CU via a first donor DU, the IP network may receive an IP address. If the IAB node 902 communicates with the CU via a second donor DU, the IP network may receive a different IP address.

In order to coordinate assertion of the IAB donor functionality, the first base station 904/Donor CU1 912 may indicate to the second base station 906/Donor CU2 914 whether the second base station 906/Donor CU2 914 is to assert the IAB donor functionality towards the IAB node 902. Additionally, or alternatively, the first base station 904/Donor CU1 912 may indicate to the second base station 906/Donor CU2 914 whether the first base station 904/Donor CU1 912 is to assert the IAB donor functionality towards the IAB node 902. In some configurations, both the first base station 904 station and the second base station 906 may be IAB donors that assert IAB functionality. For example, the first base station 904/Donor CU1 912 may indicate to the second base station 906/Donor CU2 914 that both the first base station 904 and the second base station 906 are to assert the IAB donor functionality towards the IAB node 902. In aspects, the first base station 904/Donor CU1 912 may indicate to the second base station 906/Donor CU2 914 that the first base station 904 and/or the second base station 906 is to assert a subset of the IAB donor functionality towards the IAB node 902. If the IAB node 902 is connected to two donors, a first donor (e.g., Donor CU1 912) may be for the HD constraint and a second donor (e.g., Donor CU2 914) may be for QoS support. Thus, a first IAB node may provide a resource configuration for all the IAB nodes in the topology, whereas a second IAB node may configure all BH RLC CHs and provide a corresponding BAP configuration.

The first base station 904/Donor CU1 912 may indicate to the second base station 906/Donor CU2 914 that the second base station 906/Donor CU2 914 may obtain c-plane or u-plane connectivity with the IAB node 902 via the first base station 904/Donor CU1 912 for the second base station 906/Donor CU2 914 to assert the IAB donor functionality towards the IAB node 902. In further configurations, the first base station 904/Donor CU1 912 may indicate to the second base station 906/Donor CU2 914 that the first base station 904/Donor CU1 912 is to obtain c-plane or u-plane connectivity with the IAB node 902 via the second base station 906/Donor CU2 914 for the first base station 904/Donor CU1 912 to assert the IAB donor functionality towards the IAB node 902. The second base station 906/Donor CU2 914 may accept or reject the request of the first base station 904/Donor CU1 912.

Figure 10:
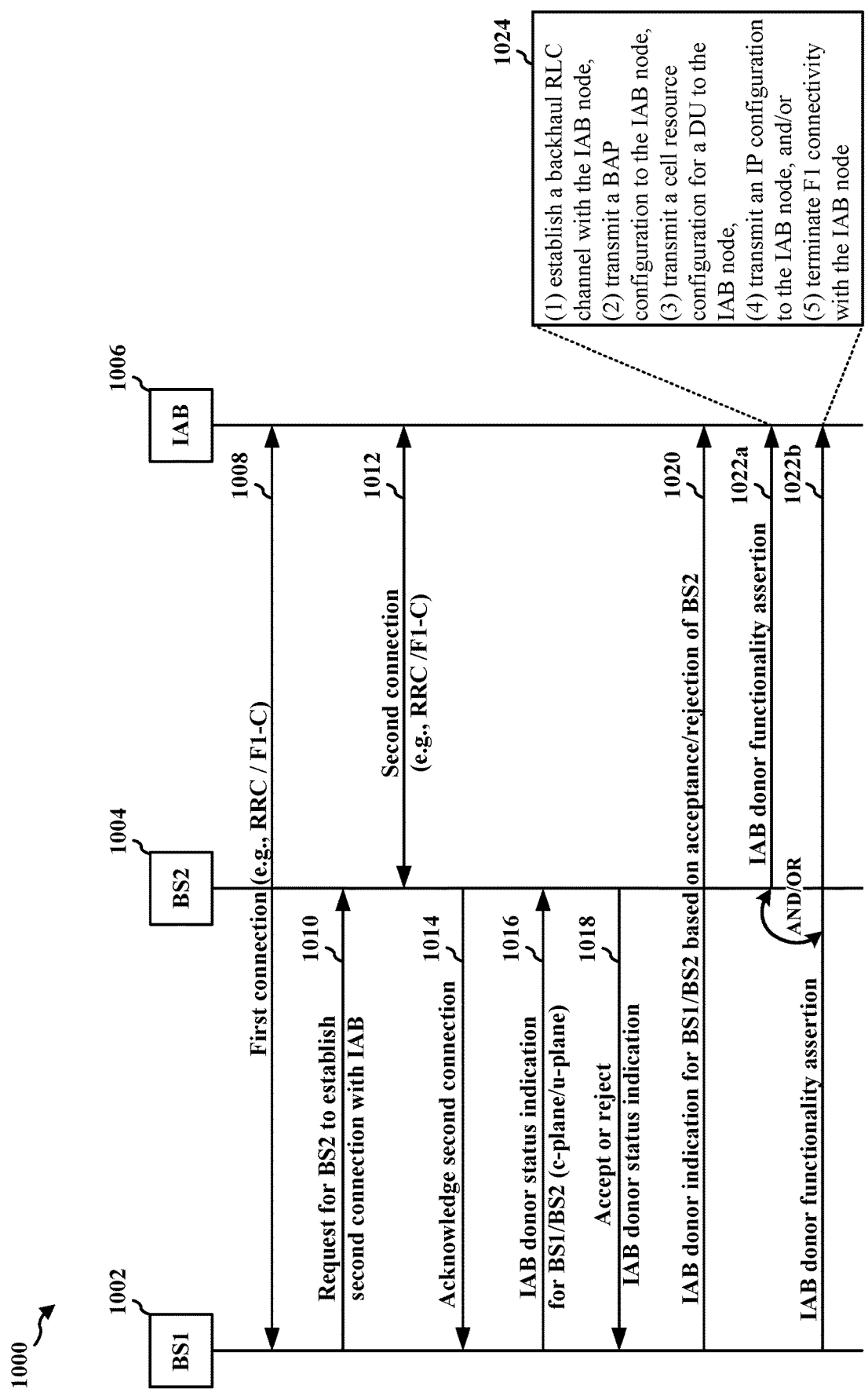
FIG. 10 is a call flow diagram illustrating communications between a first base station, a second base station, and an IAB node.

FIG. 10 is a communication flow diagram 1000 illustrating communications between a first base station 1002, a second base station 1004, and an IAB node 1006. At 1008, the first base station 1002 may establish a first connection with the IAB node 1006. The first connection established, at 1008, may correspond to a first RRC connection or a first F1-C interface. At 1010, the first base station 1002 may transmit a request to the second base station 1004 for the second base station 1004 to establish a second connection with the IAB node 1006. At 1012, the second base station 1004 may establish the second connection with the IAB node 1006 based on the request received, at 1010, from the first base station 1002. The second connection established, at 1012, may correspond to a second RRC connection or a second F1-C interface. At 1014, the second base station 1004 may transmit an acknowledgment/acceptance to the first base station 1002 indicating that the second base station 1004 has established the second connection with the IAB node 1006.

At 1016, the first base station 1002 may transmit an IAB donor status indication to the second base station 1004 indicative of whether the first base station 1002 and/or the second base station 1004 is to serve as an IAB donor for the IAB node 1006. In aspects, the indication transmitted, at 1016, may indicate whether the second base station 1004 is to establish a c-plane connection or a u-plane connection with the IAB node 1006. At 1018, the second base station 1004 may accept or reject the IAB donor status indication received, at 1016, from the first base station 1002.

At 1020, the first base station 1002 may transmit, based on the acceptance or rejection received, at 1018, from the second base station 1004, an IAB donor indication to the IAB node 1006 indicative of whether the first base station 1002 and/or the second base station 1004 is to serve as an IAB donor for the IAB node 1006. At 1022a, the second base station 1004 may assert IAB donor functionality toward the IAB node 1006 if the second base station 1004 is to serve as the IAB donor for the IAB node 1006. Additionally, or alternatively, at 1022b, the first base station 1002 may assert the IAB donor functionality toward the IAB node 1006 if the first base station 1002 is to serve as the IAB donor for the IAB node 1006. At 1024, to serve as the IAB donor/assert the IAB donor functionality toward the IAB node 1006, the first base station 1002 and/or the second base station 1004 may establish a backhaul RLC channel with the IAB node (e.g., based on 1024(1)), transmit a BAP configuration to the IAB node (e.g., based on 1024(2)), transmit a cell resource configuration for a DU to the IAB node (e.g., based on 1024(3)), transmit an IP configuration to the IAB node (e.g., based on 1024(4)), and/or terminate F1 connectivity with the IAB node (e.g., based on 1024(5)).

Figure 11:
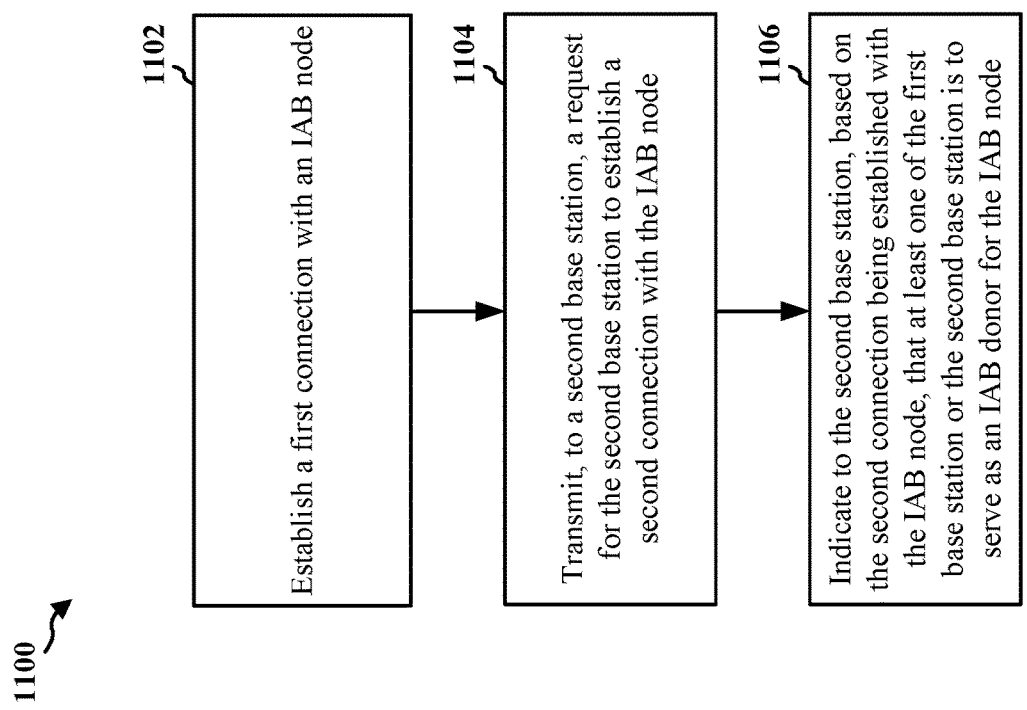
FIG. 11 is a flowchart of a method of wireless communication of a first base station.

FIG. 11 is a flowchart 1100 of a method of wireless communication. The method may be performed by a base station, e.g., the first base station 1002, which may include the memory 376 and which may be the entire first base station 1002 or a component of the first base station 1002, such as the TX processor 316, the RX processor 370, and/or the controller/processor 375. The method may enable the base station to coordinate donor functionality for an IAB node with a second base station.

At 1102, the first base station may establish a first connection with an IAB node. For example, referring to FIG. 10, the first base station 1002 may establish, at 1008, a first connection with the IAB node 1006. The first connection may be established, e.g., by the establishment component 1740 of the apparatus 1702 of FIG. 17.

At 1104, the first base station may transmit, to a second base station, a request for the second base station to establish a second connection with the IAB node. For example, referring to FIG. 10, the first base station 1002 may transmit, at 1010, a request for the second base station 1004 to establish a second connection with the IAB node 1006. The first connection (e.g., established at 1008) may be based on at least one of a first RRC connection or a first F1-C interface, and the second connection (e.g., established at 1012) may be based on at least one of a second RRC connection or a second F1-C interface. The first connection (e.g., established at 1008) and the second connection (e.g., established at 1012) may provide DC for the IAB node 1006. The DC may be associated with at least one of NR-DC, MR-DC, a DAPS, or multi-MT connectivity. The request may be transmitted, e.g., by the transmission component 1734 of the apparatus 1702.

At 1106, the first base station may indicate to the second base station, based on the second connection being established with the IAB node, that at least one of the first base station or the second base station is to serve as an IAB donor for the IAB node. For example, referring to FIG. 10, the first base station 1002 may receive, at 1014, an acknowledgement of the second connection established, at 1012, by the second base station 1004, and may transmit, at 1016, to the second base station 1004, an IAB donor status indication for the first base station 1002 and/or the second base station 1004 based on the received acknowledgement. The second connection may be indicated, e.g., by the indication component 1742 of the apparatus 1702.

Figure 12:
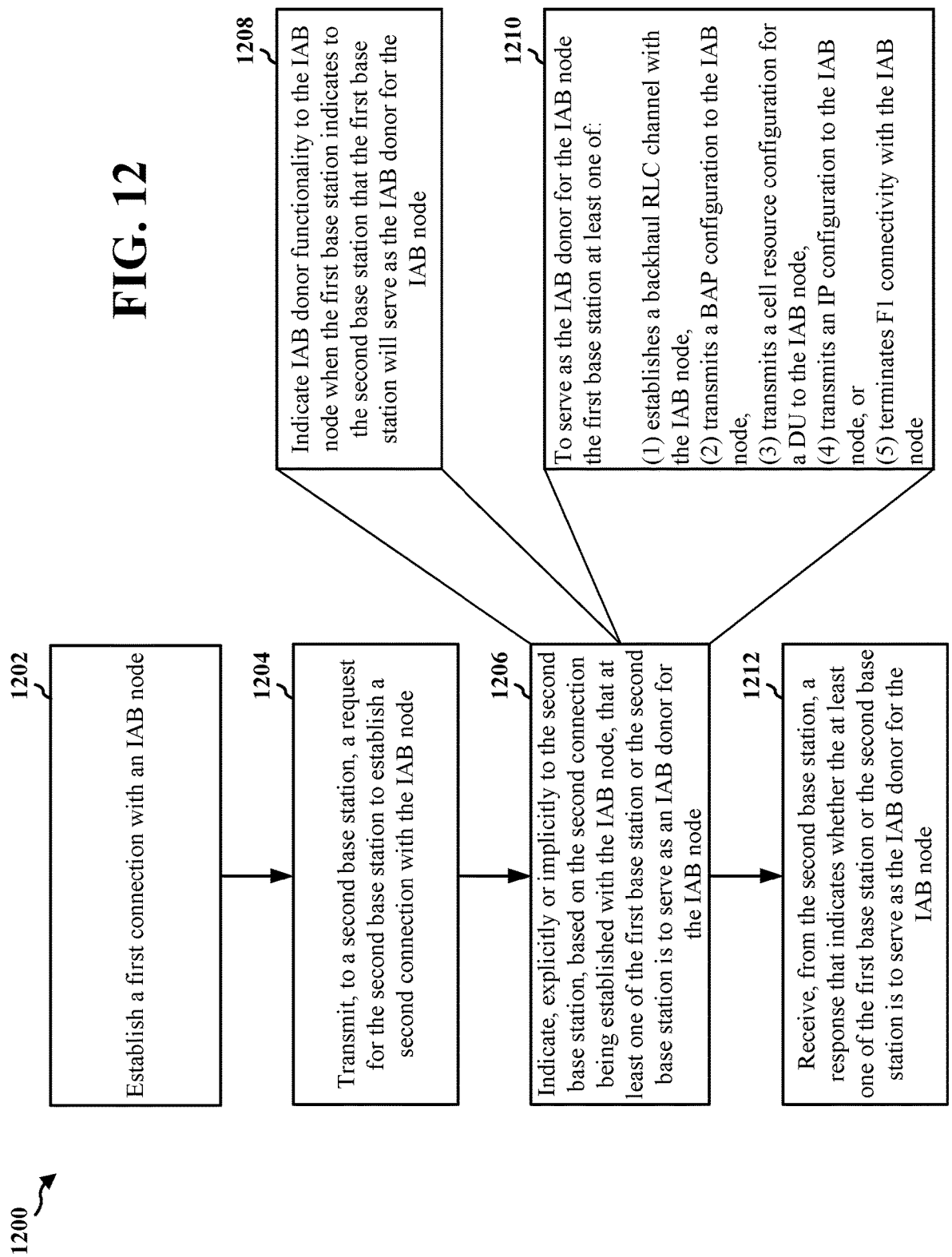
FIG. 12 is a flowchart of a method of wireless communication of a first base station.

FIG. 12 is a flowchart 1200 of a method of wireless communication. The method may be performed by a base station, e.g., the first base station 1002, which may include the memory 376 and which may be the entire first base station 1002 or a component of the first base station 1002, such as the TX processor 316, the RX processor 370, and/or the controller/processor 375. The method may enable the base station to coordinate donor functionality for an IAB node with a second base station.

At 1202, the first base station may establish a first connection with an IAB node. For example, referring to FIG. 10, the first base station 1002 may establish, at 1008, a first connection with the IAB node 1006. The first connection may be established, e.g., by the establishment component 1740 of the apparatus 1702 of FIG. 17.

At 1204, the first base station may transmit, to a second base station, a request for the second base station to establish a second connection with the IAB node. For example, referring to FIG. 10, the first base station 1002 may transmit, at 1010, a request for the second base station 1004 to establish a second connection with the IAB node 1006. The first connection (e.g., established at 1008) may be based on at least one of a first RRC connection or a first F1-C interface, and the second connection (e.g., established at 1012) may be based on at least one of a second RRC connection or a second F1-C interface. The first connection (e.g., established at 1008) and the second connection (e.g., established at 1012) may provide DC for the IAB node 1006. The DC may be associated with at least one of NR-DC, MR-DC, a DAPS, or multi-MT connectivity. The request may be transmitted, e.g., by the transmission component 1734 of the apparatus 1702 of FIG. 17.

At 1206, the first base station may indicate, explicitly or implicitly to the second base station, based on the second connection being established with the IAB node, that at least one of the first base station or the second base station is to serve as an IAB donor for the IAB node. For example, referring to FIG. 10, the first base station 1002 may receive, at 1014, an acknowledgement of the second connection established, at 1012, by the second base station 1004, and may transmit, at 1016, to the second base station 1004, an IAB donor status indication for the first base station 1002 and/or the second base station 1004 based on the received acknowledgement. The second connection may be indicated, e.g., by the indication component 1742 of the apparatus 1702 of FIG. 17.

If the first base station (e.g., master node) determines that the second base station (e.g., secondary node) is to be an F1-terminating donor node for the IAB node, the first base station may explicitly signal a corresponding request/indication to the second base station. For example, the first base station may request the second base station to locate IP addresses and establish F1 connectivity with the IAB node. Alternatively, if the first base station determines to become the F1-terminating donor node for the IAB node, the first base station does not have to explicitly signal such information to the second base station. Instead, the first base station may transmit an indication to the second base station for offloading traffic to the second base station (e.g., based on topological redundancy), or for using a communication path between the IAB node and the second base station as an access link (e.g., based on CP-UP separation), where the indication may implicitly indicate to the second base station that the first base station has determined to become the F1-terminating donor node for the IAB node.

The first base station 1002 may indicate, at 1016, to the second base station 1004 that the second base station 1004 is to serve as the IAB donor for the IAB node 1006. In some configurations, the first base station 1002 may indicate to the second base station 1004 that the second base station 1004 is to provide a subset of IAB donor functionality for the IAB node 1006. The indication, at 1016, to the second base station 1004 may further indicate that the second base station 1004 is to establish at least one of a c-plane connection or a u-plane connection with the IAB node 1006 via the first base station 1002 for serving as the IAB donor to the IAB node 1006, the c-plane connection being established in association with a CP-UP separation procedure, the u-plane connection being established in association with a topological redundancy procedure. Alternatively, the first base station 1002 may indicate, at 1016, to the second base station 1004 that the first base station 1002 is to serve as the IAB donor for the IAB node 1006. The indication, at 1016, to the second base station 1004 may further indicate that the first base station 1002 is to establish at least one of a c-plane connection or a u-plane connection with the IAB node 1006 via the second base station 1004 for serving as the IAB donor to the IAB node 1006. In further aspects, the first base station 1002 may indicate, at 1016, to the second base station 1004 that the first base station 1002 and the second base station 1004 are to serve as IAB donors for the IAB node 1006.

At 1208, the first base station may indicate IAB donor functionality to the IAB node when the first base station indicates to the second base station that the first base station will serve as the IAB donor for the IAB node. For example, referring to FIG. 10, the first base station 1002 may indicate, at 1022b, an IAB donor functionality assertion to the IAB node 1006 when the IAB donor status indication transmitted, at 1016, indicates that the second base station 1004 is to serve as the IAB donor for the IAB node 1006. The IAB donor functionality may be indicated, e.g., by the indication component 1742 of the apparatus 1702 of FIG. 17.

At 1210, to serve as the IAB donor for the IAB node the first base station may at least one of: establish a backhaul RLC channel with the IAB node, transmit a BAP configuration to the IAB node, transmit a cell resource configuration for a DU to the IAB node, transmit an IP configuration to the IAB node, or terminate F1 connectivity with the IAB node.

For example, referring to FIG. 10, to indicate the IAB donor functionality/serve as the IAB donor for the IAB node 1006, the first base station 1002 may, at 1024, (1) establish a backhaul RLC channel with the IAB node, (2) transmit a BAP configuration to the IAB node, (3) transmit a cell resource configuration for a DU to the IAB node, (4) transmit an IP configuration to the IAB node, and/or (5) terminate F1 connectivity with the IAB node. Serving as the IAB donor may be performed, e.g., by the establishment component 1740, the termination component 1744, and/or the transmission component 1734 of the apparatus 1702 of FIG. 17.

At 1212, the first base station may receive, from the second base station, a response that indicates whether the at least one of the first base station or the second base station is to serve as the IAB donor for the IAB node. For example, referring to FIG. 10, the first base station 1002 may receive, at 1018, and acceptance or rejection to the IAB donor status indication from the second base station 1004. The response may be received, e.g., by the reception component 1730 of the apparatus 1702 of FIG. 17.

Figure 13:
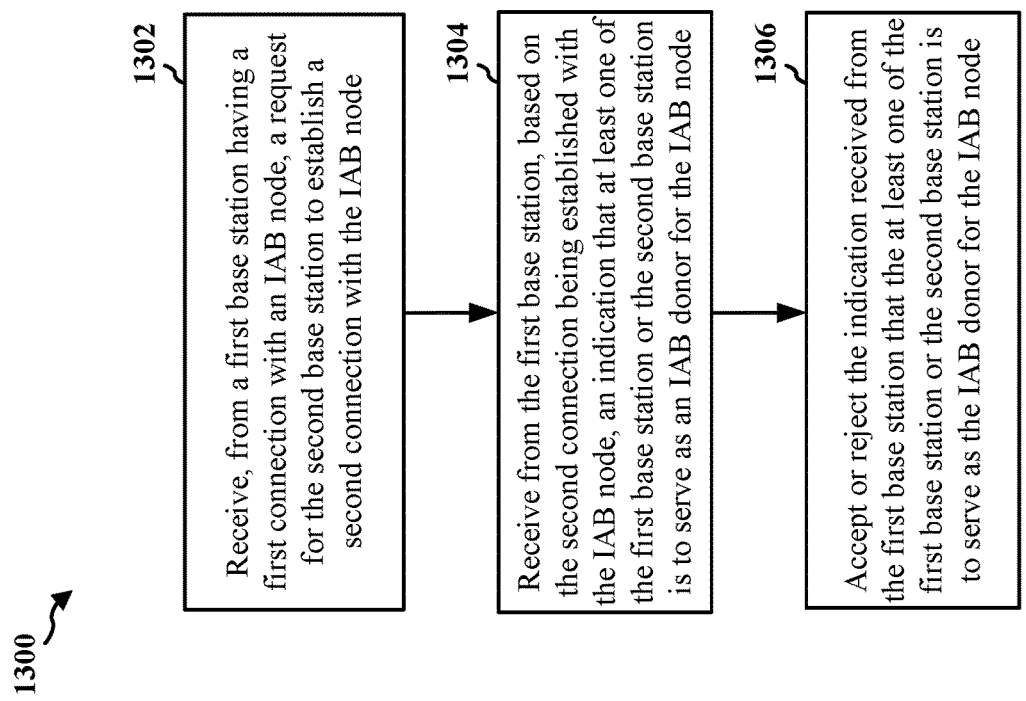
FIG. 13 is a flowchart of a method of wireless communication of a second base station.

FIG. 13 is a flowchart 1300 of a method of wireless communication. The method may be performed by a base station, e.g., the second base station 1004, which may include the memory 376 and which may be the entire second base station 1004 or a component of the second base station 1004, such as the TX processor 316, the RX processor 370, and/or the controller/processor 375. The method may enable the base station to coordinate donor functionality for an IAB node with a second base station.

At 1302, the second base station may receive, from a first base station having a first connection with an IAB node, a request for the second base station to establish a second connection with the IAB node. For example, referring to FIG. 10, the second base station 1004 may receive, at 1010, a request from the first base station 1002 including the first connection established, at 1008, with the IAB node 1006, the request being for the second base station 1004 to establish a second connection with the IAB node 1006. The first connection (e.g., established at 1008) may be based on at least one of a first RRC connection or a first F1-C interface, and the second connection (e.g., established at 1012) may be based on at least one of a second RRC connection or a second F1-C interface. The first connection (e.g., established at 1008) and the second connection (e.g., established at 1012) may provide DC for the IAB node 1006, the DC associated with at least one of NR-DC, MR-DC, a DAPS, or multi-MT connectivity. The request may be received, e.g., by the reception component 1830 of the apparatus 1802 of FIG. 18.

At 1304, the second base station may receive from the first base station, based on the second connection being established with the IAB node, an indication that at least one of the first base station or the second base station is to serve as an IAB donor for the IAB node. For example, referring to FIG. 10, the second base station 1004 may receive, at 1016, an IAB donor status indication for the first base station 1002 and/or the second base station 1004 based an acknowledgment of the second connection transmitted, at 1014, from the second base station 1004 to the first base station 1002. The indication may be received, e.g., by the reception component 1830 of the apparatus 1802 of FIG. 18.

At 1306, the second base station may accept or reject the indication received from the first base station that the at least one of the first base station or the second base station is to serve as the IAB donor for the IAB node. For example, referring to FIG. 10, the second base station 1004 may transmit, at 1018, an acceptance or rejection to the IAB donor status indication received, at 1016, from the first base station 1002 indicating that the first base station 1002 and/or the second base station 1004 is to serve as the IAB donor for the IAB node 1006. The indication may be accepted or rejected, e.g., by the acceptance-rejection component 1840 of the apparatus 1802 of FIG. 18.

Figure 14:
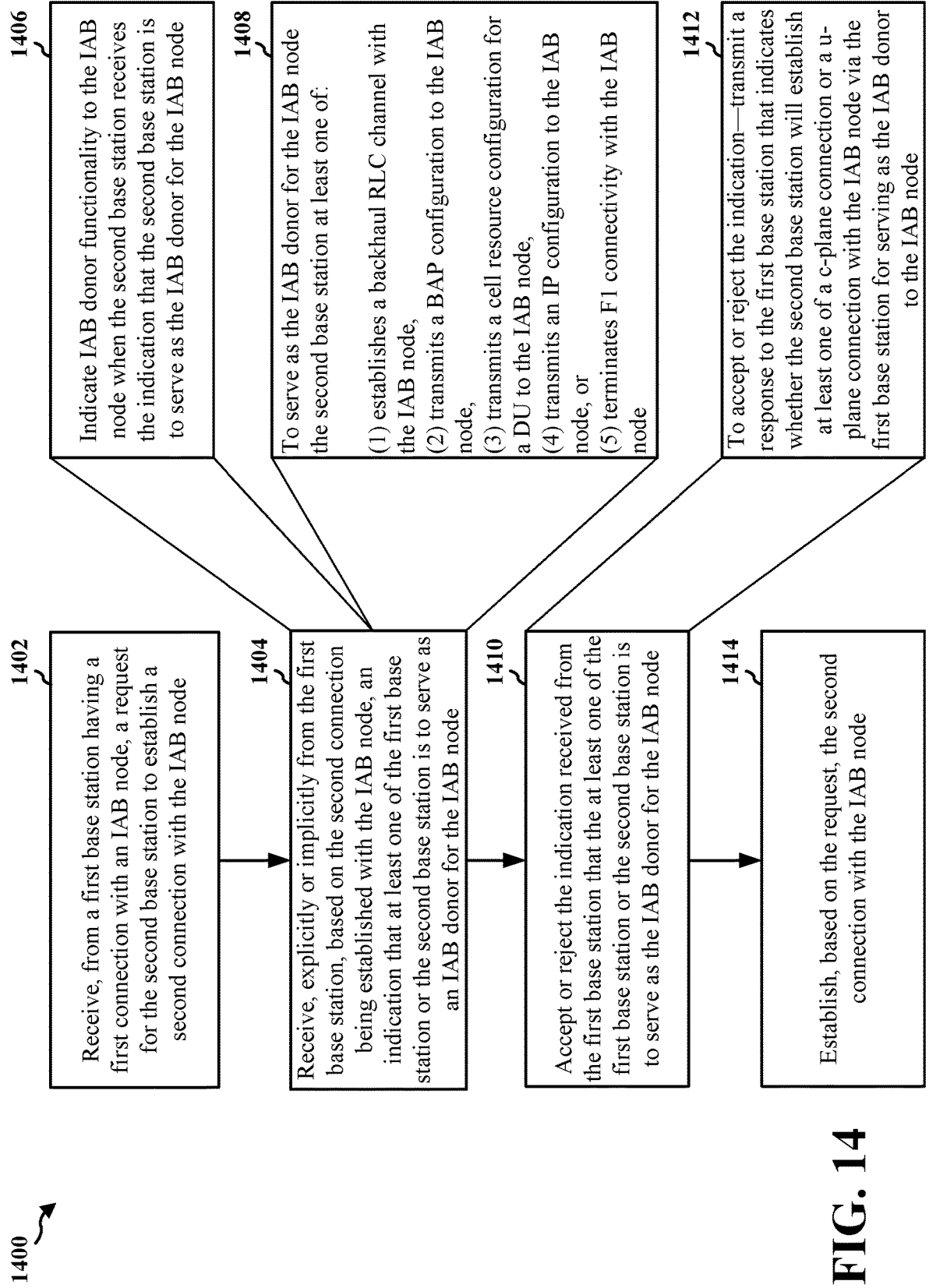
FIG. 14 is a flowchart of a method of wireless communication of a second base station.

FIG. 14 is a flowchart 1400 of a method of wireless communication. The method may be performed by a base station, e.g., the second base station 1004, which may include the memory 376 and which may be the entire second base station 1004 or a component of the second base station 1004, such as the TX processor 316, the RX processor 370, and/or the controller/processor 375. The method may enable the base station to coordinate donor functionality for an IAB node with a second base station.

At 1402, the second base station may receive, from a first base station having a first connection with an IAB node, a request for the second base station to establish a second connection with the IAB node. For example, referring to FIG. 10, the second base station 1004 may receive, at 1010, a request from the first base station 1002 including the first connection established, at 1008, with the IAB node 1006, the request being for the second base station 1004 to establish a second connection with the IAB node 1006. The first connection (e.g., established at 1008) may be based on at least one of a first RRC connection or a first F1-C interface, and the second connection (e.g., established at 1012) may be based on at least one of a second RRC connection or a second F1-C interface. The first connection (e.g., established at 1008) and the second connection (e.g., established at 1012) may provide DC for the IAB node 1006, the DC associated with at least one of NR-DC, MR-DC, a DAPS, or multi-MT connectivity. The request may be received, e.g., by the reception component 1830 of the apparatus 1802 of FIG. 18.

At 1404, the second base station may receive, explicitly or implicitly from the first base station, based on the second connection being established with the IAB node, an indication that at least one of the first base station or the second base station is to serve as an IAB donor for the IAB node. For example, referring to FIG. 10, the second base station 1004 may receive, at 1016, an IAB donor status indication for the first base station 1002 and/or the second base station 1004 based an acknowledgment of the second connection transmitted, at 1014, from the second base station 1004 to the first base station 1002. The indication may be received, e.g., by the reception component 1830 of the apparatus 1802 of FIG. 18.

If the first base station (e.g., master node) determines that the second base station (e.g., secondary node) is to be an F1-terminating donor node for the IAB node, the first base station may explicitly signal a corresponding request/indication to the second base station. For example, the first base station may request the second base station to location IP addresses and establish F1 connectivity with the IAB node. Alternatively, if the first base station determines to become the F1-terminating donor node for the IAB node, the first base station does not have to explicitly signal such information to the second base station. Instead, the first base station may transmit an indication to the second base station for offloading traffic to the second base station (e.g., based on topological redundancy), or for using a communication path between the IAB node and the second base station as an access link (e.g., based on CP-UP separation), where the indication may implicitly indicate to the second base station that the first base station has determined to become the F1-terminating donor node for the IAB node.

The second base station 1004 may receive, at 1016, the indication that the second base station 1004 is to serve as the IAB donor for the IAB node 1006. In some configurations, the indication received, at 1016, from the first base station 1002 may indicate that the second base station 1004 is to provide a subset of IAB donor functionality for the IAB node 1006. The indication received, at 1016, from the first base station 1002 may further indicate to the second base station 1004 that the second base station 1004 is to establish at least one of a c-plane connection or a u-plane connection with the IAB node 1006 via the first base station 1002 for serving as the IAB donor to the IAB node 1006, the c-plane connection being established in association with a CP-UP separation procedure, the u-plane connection being established in association with a topological redundancy procedure. Alternatively, the second base station 1004 may receive, at 1016, the indication from the first base station 1002 indicating that the first base station 1002 is to serve as the IAB donor for the IAB node 1006. The indication received, at 1016, from the first base station 1002 may further indicate that the first base station 1002 is to establish at least one of a c-plane connection or a u-plane connection with the IAB node 1006 via the second base station 1004 for serving as the IAB donor to the IAB node 1006. In further aspects, the indication received, at 1016, from the first base station 1002 may indicate that the first base station 1002 and the second base station 1004 are to serve as IAB donors for the IAB node 1006.

At 1406, the second base station may indicate IAB donor functionality to the IAB node when the second base station receives the indication that the second base station is to serve as the IAB donor for the IAB node. For example, referring to FIG. 10, the second base station 1004 may indicate, at 1022a, an IAB donor functionality assertion to the IAB node 1006 when the IAB donor status indication received, at 1016, indicates that the second base station 1004 is to serve as the IAB donor for the IAB node 1006. The IAB donor functionality may be indicated, e.g., by the indication component 1844 of the apparatus 1802 of FIG. 18.

At 1408, to serve as the IAB donor for the IAB node the second base station may at least one of: establish a backhaul RLC channel with the IAB node, transmit a BAP configuration to the IAB node, transmit a cell resource configuration for a DU to the IAB node, transmit an IP configuration to the IAB node, or terminate F1 connectivity with the IAB node. For example, referring to FIG. 10, to indicate the IAB donor functionality/serve as the IAB donor for the IAB node 1006, the second base station 1004 may, at 1024, (1) establish a backhaul RLC channel with the IAB node, (2) transmit a BAP configuration to the IAB node, (3) transmit a cell resource configuration for a DU to the IAB node, (4) transmit an IP configuration to the IAB node, and/or (5) terminate F1 connectivity with the IAB node. Serving as the IAB donor may be performed, e.g., by the establishment component 1842, the termination component 1846, and/or the transmission component 1834 of the apparatus 1802 of FIG. 18.

At 1410, the second base station may accept or reject the indication received from the first base station that the at least one of the first base station or the second base station is to serve as the IAB donor for the IAB node. For example, referring to FIG. 10, the second base station 1004 may transmit, at 1018, an acceptance or rejection to the IAB donor status indication received, at 1016, from the first base station 1002 indicating that the first base station 1002 and/or the second base station 1004 is to serve as the IAB donor for the IAB node 1006. The indication may be accepted or rejected, e.g., by the acceptance-rejection component 1840 of the apparatus 1802 of FIG. 18.

At 1412, to accept or reject the indication, the second base station may, transmit a response to the first base station that indicates whether the second base station will establish at least one of a c-plane connection or a u-plane connection with the IAB node via the first base station for serving as the IAB donor to the IAB node. For example, referring to FIG. 10, to accept or reject, at 1018, the IAB donor status indication received, at 1016, the second base station 1004 may include in the acceptance/rejection an indication of whether the second base station 1004 will establish the c-plane or u-plane connection with the IAB node 1006. The response may be transmitted, e.g., by the transmission component 1834 and/or the acceptance-rejection component 1840 of the apparatus 1802 of FIG. 18.

At 1414, the second base station may establish, based on the request, the second connection with the IAB node. For example, referring to FIG. 10, the second base station 1004 may establish, at 1012, the second connection with the IAB node 1006 based on the request received, at 1010, for the second base station 1004 to establish the second connection with the IAB node 1006. The second connection may be established, e.g., by the establishment component 1842 of the apparatus 1802 of FIG. 18.

Figure 15:
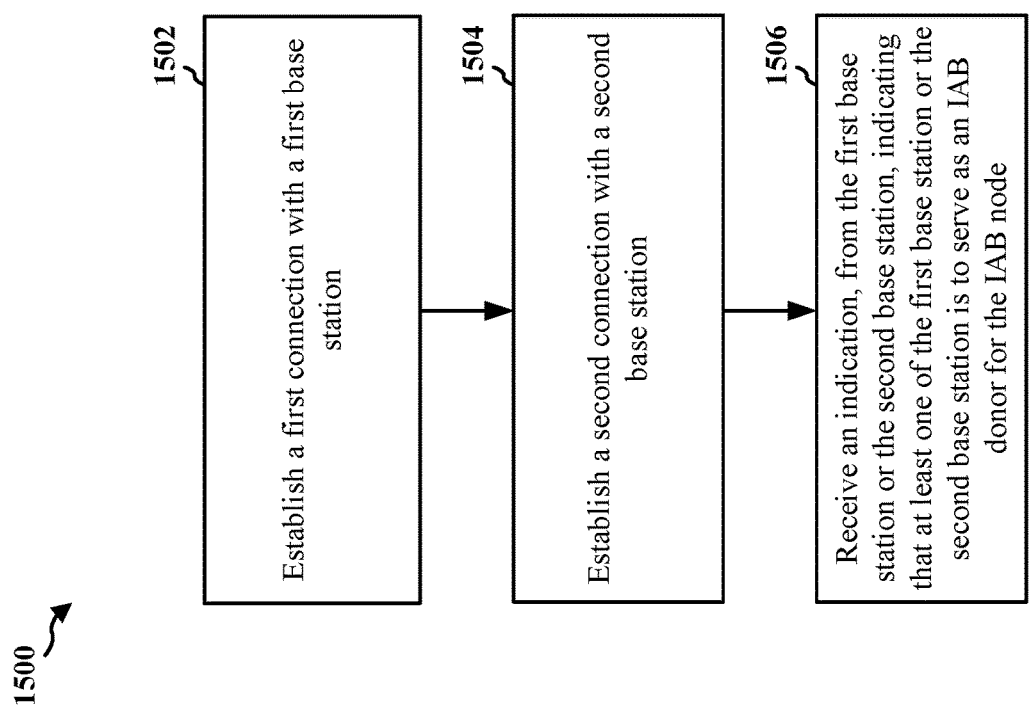
FIG. 15 is a flowchart of a method of wireless communication of an IAB node.

FIG. 15 is a flowchart 1500 of a method of wireless communication. The method may be performed by a base station/IAB node, e.g., the IAB node 1006, which may include the memory 376 and which may be the entire IAB node 1006 or a component of the IAB node 1006, such as the TX processor 316, the RX processor 370, and/or the controller/processor 375. The method improves multi-connectivity for the IAB node.

At 1502, the IAB node may establish a first connection with a first base station. For example, referring to FIG. 10, the IAB node 1006 may establish, at 1008, a first connection with the first base station 1002. The first connection may be established, e.g., by the first connection component 1940 of the apparatus 1902 of FIG. 19.

At 1504, the IAB node may establish a second connection with a second base station. For example, referring to FIG. 10, the IAB node 1006 may establish, at 1012, a second connection with the second base station 1004. The first connection (e.g., established at 1008) may be based on at least one of a first RRC connection or a first F1-C interface, and the second connection (e.g., established at 1012) may be based on at least one of a second RRC connection or a second F1-C interface. The first connection (e.g., established at 1008) and the second connection (e.g., established at 1012) may provide DC for the IAB node 1006, the DC associated with at least one of NR-DC, MR-DC, a DAPS, or multi-MT connectivity. The second connection may be established, e.g., by the second connection component 1942 of the apparatus 1902 of FIG. 19.

At 1506, the IAB node may receive an indication, from the first base station or the second base station, indicating that at least one of the first base station or the second base station is to serve as an IAB donor for the IAB node. For example, referring to FIG. 10, the IAB node 1006 may receive, at 1020, an IAB donor indication for the first base station 1002 and/or the second base station 1004. In some configurations, the IAB node 1006 may receive, at 1020, the indication that the second base station 1004 is to provide a subset of IAB donor functionality for the IAB node 1006. The IAB node 1006 may be served by an IAB donor based on at least one of a backhaul RLC channel established with the IAB node 1006, a BAP configuration transmitted to the IAB node 1006, a cell resource configuration for a DU transmitted to the IAB node 1006, an IP configuration transmitted to the IAB node 1006, and/or F1 connectivity being terminated with the IAB node 1006. The IAB node 1006 may receive, at 1020, the indication that the second base station 1004 is to serve as the IAB donor for the IAB node 1006. Alternatively, the IAB node 1006 may receive, at 1020, the indication that the first base station 1002 is to serve as the IAB donor for the IAB node 1006. In further aspects, the IAB node 1006 may receive, at 1020, the indication that the first base station 1002 and the second base station 1004 are to serve as IAB donors for the IAB node 1006. The indication may be received, e.g., by the reception component 1930 and/or the indication component 1944 of the apparatus 1902 of FIG. 19.

Figure 16:
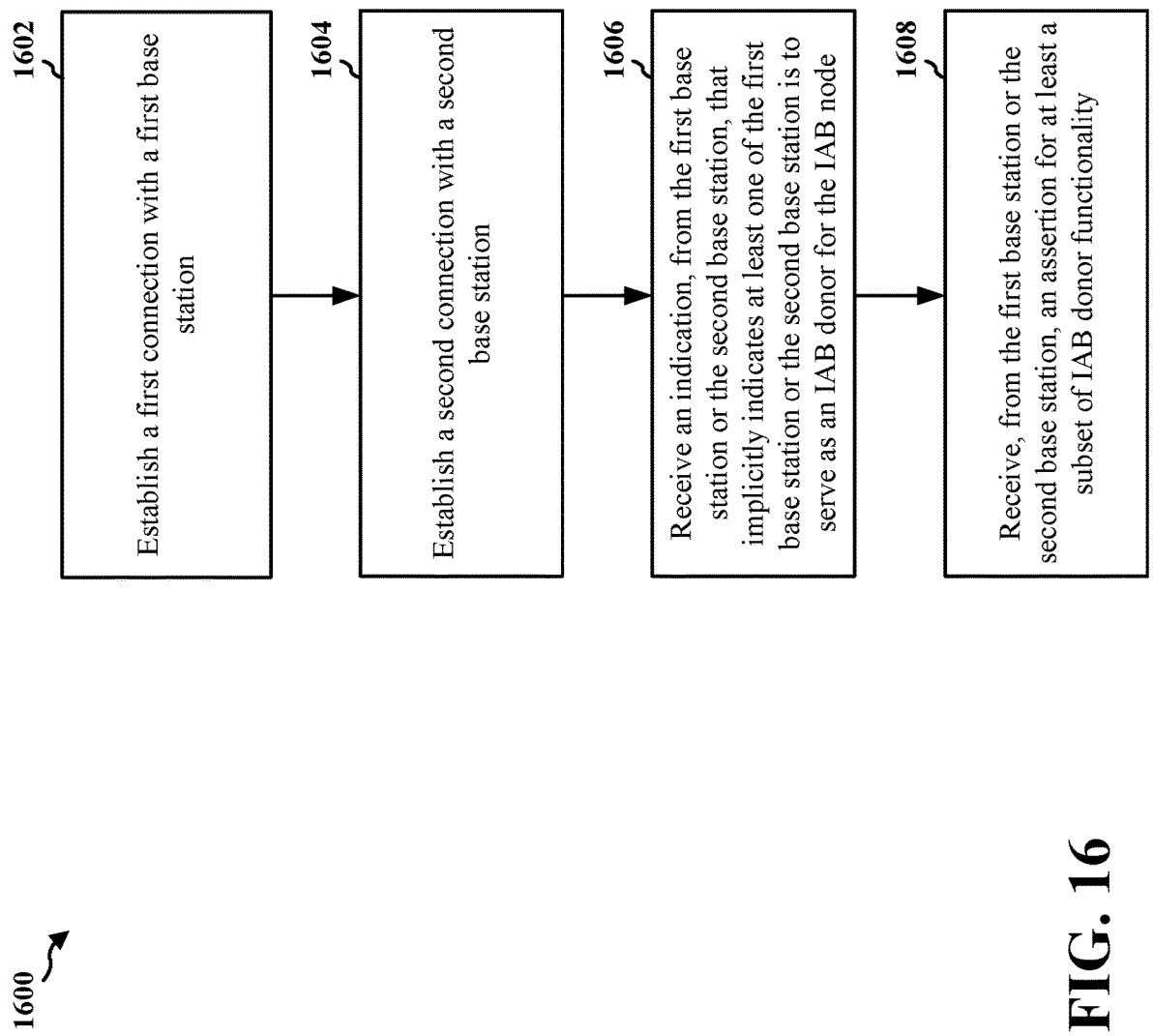
FIG. 16 is a flowchart of a method of wireless communication of an IAB node.

FIG. 16 is a flowchart 1600 of a method of wireless communication. The method may be performed by a base station/IAB node, e.g., the IAB node 1006, which may include the memory 376 and which may be the entire IAB node 1006 or a component of the IAB node 1006, such as the TX processor 316, the RX processor 370, and/or the controller/processor 375. The method improves multi-connectivity for the IAB node.

At 1602, the IAB node may establish a first connection with a first base station. For example, referring to FIG. 10, the IAB node 1006 may establish, at 1008, a first connection with the first base station 1002. The first connection may be established, e.g., by the first connection component 1940 of the apparatus 1902 of FIG. 19.

At 1604, the IAB node may establish a second connection with a second base station. For example, referring to FIG. 10, the IAB node 1006 may establish, at 1012, a second connection with the second base station 1004. The first connection (e.g., established at 1008) may be based on at least one of a first RRC connection or a first F1-C interface, and the second connection (e.g., established at 1012) may be based on at least one of a second RRC connection or a second F1-C interface. The first connection (e.g., established at 1008) and the second connection (e.g., established at 1012) may provide DC for the IAB node 1006, the DC associated with at least one of NR-DC, MR-DC, a DAPS, or multi-MT connectivity. The second connection may be established, e.g., by the second connection component 1942 of the apparatus 1902 of FIG. 19.

At 1606, the IAB node may receive an indication, from the first base station or the second base station, that implicitly indicates at least one of the first base station or the second base station is to serve as an IAB donor for the IAB node. For example, referring to FIG. 10, the IAB node 1006 may receive, at 1020, an IAB donor indication for the first base station 1002 and/or the second base station 1004. If the IAB node establishes NR-DC with the first base station (e.g., master node) and the second base station (e.g., secondary node) before F1 connectivity is established with the IAB node, the IAB node may determine whether the first base station or the second base station is serving as the F1-terminating donor node based on which of the first base station or the second base station provides a BAP configuration and/or IP address(es) to the IAB node. That is, receiving the BAP configuration and/or the IP address(es) from a particular base station may implicitly indicate to the IAB node that the particular base station is serving as the F1-terminating donor node.

In some configurations, the IAB node 1006 may receive, at 1020, the indication that the second base station 1004 is to provide a subset of IAB donor functionality for the IAB node 1006. The IAB node 1006 may be served by an IAB donor based on at least one of a backhaul RLC channel established with the IAB node 1006, a BAP configuration transmitted to the IAB node 1006, a cell resource configuration for a DU transmitted to the IAB node 1006, an IP configuration transmitted to the IAB node 1006, and/or F1 connectivity being terminated with the IAB node 1006. The IAB node 1006 may receive, at 1020, the indication that the second base station 1004 is to serve as the IAB donor for the IAB node 1006. Alternatively, the IAB node 1006 may receive, at 1020, the indication that the first base station 1002 is to serve as the IAB donor for the IAB node 1006. In further aspects, the IAB node 1006 may receive, at 1020, the indication that the first base station 1002 and the second base station 1004 are to serve as IAB donors for the IAB node 1006. The indication may be received, e.g., by the reception component 1930 and/or the indication component 1944 of the apparatus 1902 of FIG. 19.

At 1608, the IAB node may receive, from the first base station or the second base station, an assertion for at least a subset of IAB donor functionality. For example, referring to FIG. 10, the IAB node 1006 may receive, at 1022*a*, a first IAB donor functionality assertion from the second base station 1004, and/or the IAB node 1006 may receive, at 1022*b*, a second IAB donor functionality assertion from the first base station 1002. The assertion may be received, e.g., by the reception component 1930 of the apparatus 1902 of FIG. 19.

Figure 17:
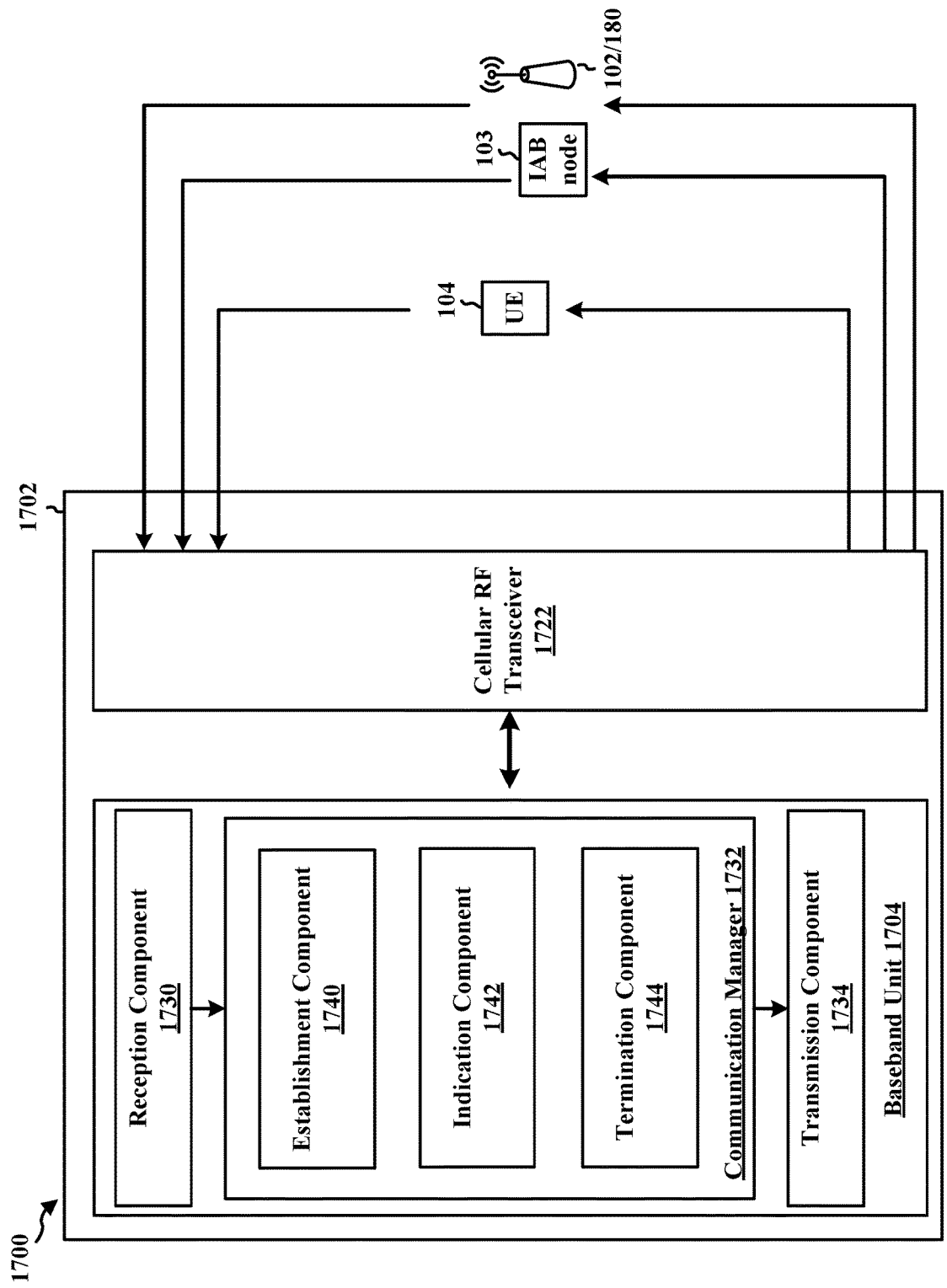
FIG. 17 is a diagram illustrating an example of a hardware implementation for an example apparatus.

FIG. 17 is a diagram 1700 illustrating an example of a hardware implementation for an apparatus 1702. The apparatus 1702 is a BS and includes a baseband unit 1704. The baseband unit 1704 may communicate through a cellular RF transceiver 1722 with the IAB node 103, a second base station 102/180, and/or UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the first wireless device 310 and may include the memory 376 and/or at least one of the TX processor 316, the RX processor 370, and the controller/processor 375.

The communication manager 1732 includes an establishment component 1740 that is configured, e.g., as described in connection with 1102, 1202, and 1210, to establish a first connection with an IAB node 103; and to establish a backhaul RLC channel with the IAB node 103. The communication manager 1732 further includes an indication component 1742 that is configured, e.g., as described in connection with 1106, 1206, and 1208, to indicate (e.g., explicitly or implicitly) to the second base station 102/180, based on the second connection being established with the IAB node 103, that at least one of the first base station (e.g., the apparatus 1702) or the second base station is to serve as an IAB donor for the IAB node; and to indicate IAB donor functionality to the IAB node when the apparatus 1702 indicates to the second base station that the first base station will serve as the IAB donor for the IAB node. The communication manager 1732 further includes a termination component 1744 that is configured, e.g., as described in connection with 1210, to terminate F1 connectivity with the IAB node 103.

The reception component 1730 is configured, e.g., as described in connection with 1212, to receive, from the second base station 102/180, a response that indicates whether the at least one of the first base station (e.g., the apparatus 1702) or the second base station is to serve as the IAB donor for the IAB node. The transmission component 1734 may be configured, e.g., as described in connection with 1104, 1204, and 1210, to transmit, to a second base station, a request for the second base station to establish a second connection with the IAB node; transmit a BAP configuration to the IAB node; transmit a cell resource configuration for a DU to the IAB node; and transmit an IP configuration to the IAB node.

The apparatus may include additional components that perform each of the blocks of the algorithm in the aforementioned flowcharts of FIGS. 11-12. As such, each block in the aforementioned flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for establishing a first connection with an IAB node; means for transmitting, to a second base station, a request for the second base station to establish a second connection with the IAB node; and means for indicating to the second base station, based on the second connection being established with the IAB node, that at least one of the first base station or the second base station is to serve as an IAB donor for the IAB node. The apparatus 1702 further includes means for indicating IAB donor functionality to the IAB node. The apparatus 1702 further includes means for establishing a backhaul RLC channel with the IAB node; means for transmitting a BAP configuration to the IAB node; means for transmitting a cell resource configuration for a DU to the IAB node; means for transmitting an IP configuration to the IAB node; and means for terminating F1 connectivity with the IAB node. The apparatus 1702 further includes means for receiving, from the second base station, a response that indicates whether the at least one of the first base station or the second base station is to serve as the IAB donor for the IAB node. The aforementioned means may be one or more of the aforementioned components of the apparatus 1702 configured to perform the functions recited by the aforementioned means. As described supra, the apparatus 1702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 18:
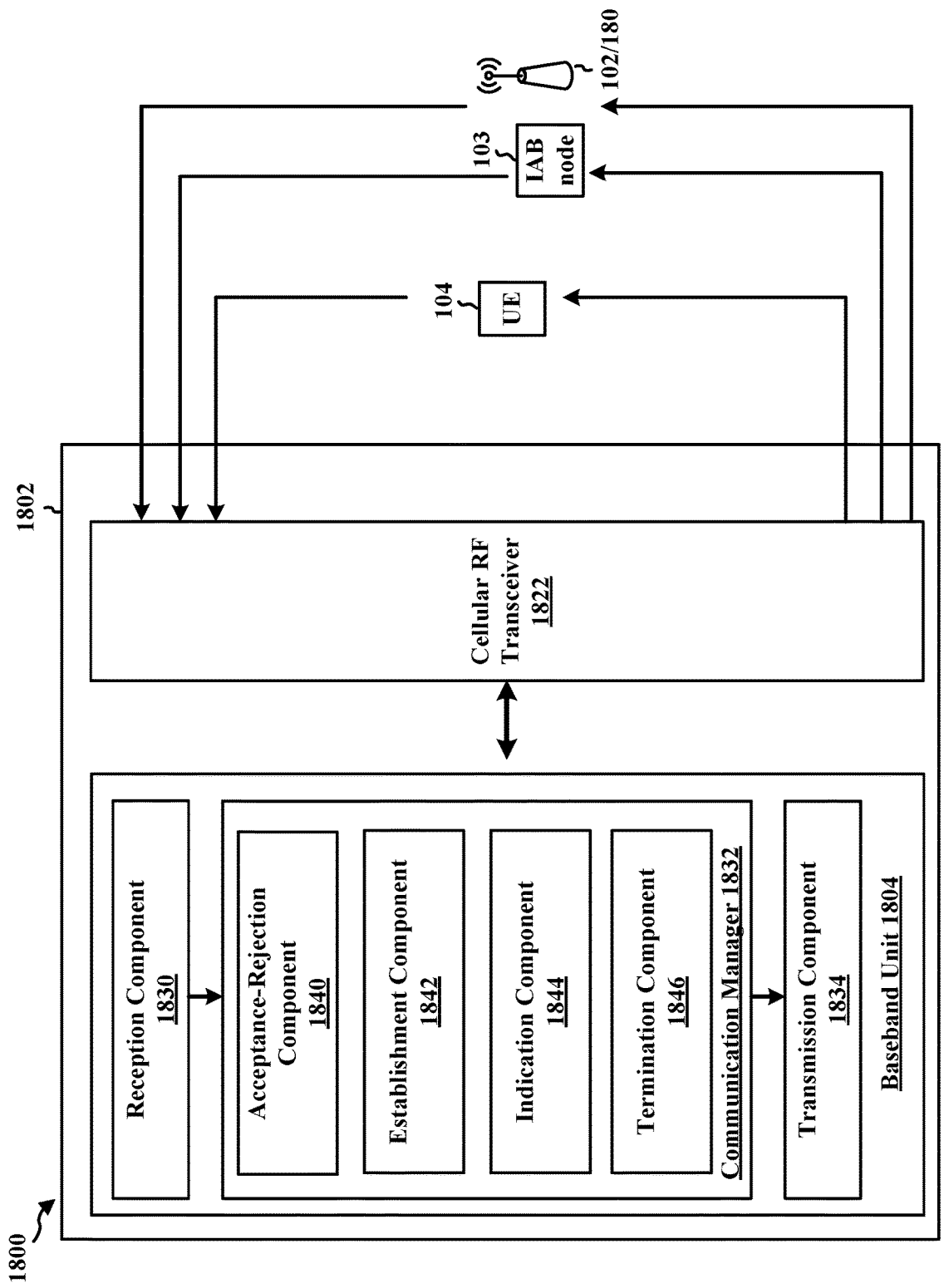
FIG. 18 is a diagram illustrating an example of a hardware implementation for an example apparatus.

FIG. 18 is a diagram 1800 illustrating an example of a hardware implementation for an apparatus 1802. The apparatus 1802 is a BS and includes a baseband unit 1804. The baseband unit 1804 may communicate through a cellular RF transceiver 1822 with the base station 102/180, the IAB node 103, and/or the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the first wireless device 310 and may include the memory 376 and/or at least one of the TX processor 316, the RX processor 370, and the controller/processor 375.

The communication manager 1832 includes an acceptance-rejection component 1840 that is configured, e.g., as described in connection with 1306 and 1410, to accept or reject the indication received from the first base station that the at least one of the first base station or the second base station (e.g., the apparatus 1802) is to serve as the IAB donor for the IAB node 103. The communication manager 1832 further includes an establishment component 1842 that is configured, e.g., as described in connection with 1414 and 1408, to establish, based on the request, the second connection with the IAB node 103; and to establish a backhaul RLC channel with the IAB node 103. The communication manager 1832 further includes an indication component 1844 that is configured, e.g., as described in connection with 1406, to indicate IAB donor functionality to the IAB node when the second base station (e.g., the apparatus 1802) receives the indication that the second base station is to serve as the IAB donor for the IAB node. The communication manager 1832 further includes a termination component 1846 that is configured, e.g., as described in connection with 1408, to terminate F1 connectivity with the IAB node.

The reception component 1830 is configured, e.g., as described in connection with 1302, 1304, 1402 and 1404, to receive, from a first base station having a first connection with an IAB node, a request for the second base station (e.g., the apparatus 1802) to establish a second connection with the IAB node; and to receive (e.g., explicitly or implicitly) from the first base station, based on the second connection being established with the IAB node 103, an indication that at least one of the first base station or the second base station (e.g., the apparatus 1802) is to serve as an IAB donor for the IAB node 103. The transmission component 1834 is configured, e.g., as described in connection with 1408 and 1412, to transmit a BAP configuration to the IAB node 103; to transmit a cell resource configuration for a DU to the IAB node 103; to transmit an IP configuration to the IAB node 103; and to transmit a response to the first base station that indicates whether the second base station (e.g., the apparatus 1802) will establish at least one of a c-plane connection or a u-plane connection with the IAB node 103 via the first base station for serving as the IAB donor to the IAB node 103.

The apparatus may include additional components that perform each of the blocks of the algorithm in the aforementioned flowcharts of FIGS. 13-14. As such, each block in the aforementioned flowcharts of FIGS. 13-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband unit 1804, includes means for receiving, from a first base station having a first connection with an IAB node, a request for the second base station to establish a second connection with the IAB node; means for receiving from the first base station, based on the second connection being established with the IAB node, an indication that at least one of the first base station or the second base station is to serve as an IAB donor for the IAB node; and means for accepting or rejecting the indication received from the first base station that the at least one of the first base station or the second base station is to serve as the IAB donor for the IAB node. The means for accepting or rejecting the indication is further configured to transmit a response to the first base station that indicates whether the second base station will establish at least one of a c-plane connection or a u-plane connection with the IAB node via the first base station for serving as the IAB donor to the IAB node. The apparatus 1802 further includes means for establishing, based on the request, the second connection with the IAB node. The apparatus 1802 further includes means for indicating IAB donor functionality to the IAB node when the second base station is to serve as the IAB donor for the IAB node. The apparatus 1802 further includes means for establishing a backhaul RLC channel with the IAB node; means for transmitting a BAP configuration to the IAB node; means for transmitting a cell resource configuration for a DU to the IAB node; means for transmitting an IP configuration to the IAB node; and means for terminating F1 connectivity with the IAB node.

The aforementioned means may be one or more of the aforementioned components of the apparatus 1802 configured to perform the functions recited by the aforementioned means. As described supra, the apparatus 1802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
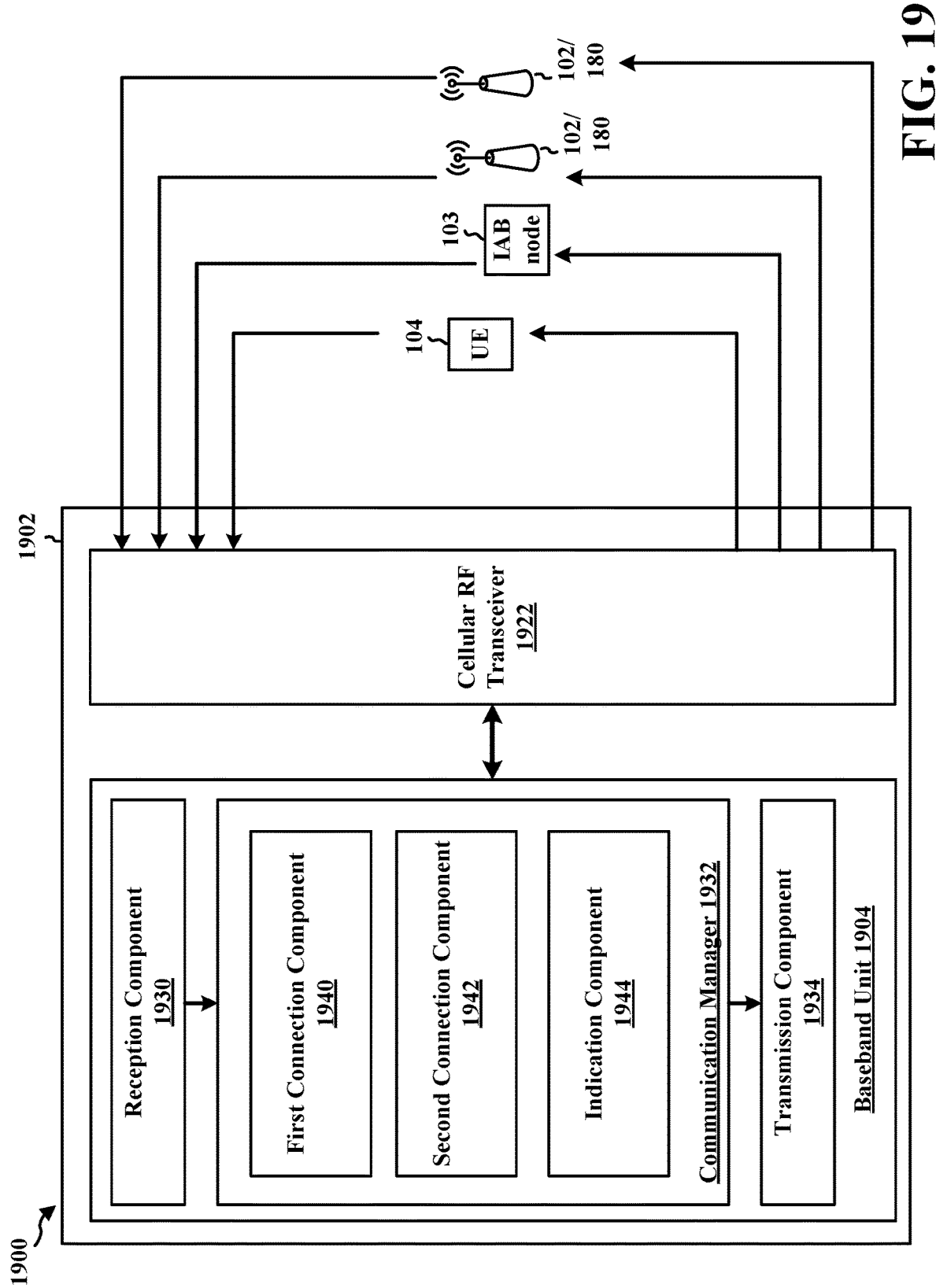
FIG. 19 is a diagram illustrating an example of a hardware implementation for an example apparatus.

FIG. 19 is a diagram 1900 illustrating an example of a hardware implementation for an apparatus 1902. The apparatus 1902 is an IAB node and includes a baseband unit 1904. The baseband unit 1904 may communicate through a cellular RF transceiver 1922 with a first and second base station 102/180, another IAB node 103, and/or the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the first wireless device 310 or the second wireless device 350 and may include the memory 360 or 376 and/or at least one of the TX processor 316 or 368, the RX processor 356 or 370, and the controller/processor 359 or 375.

The communication manager 1932 includes a first connection component 1940 that is configured, e.g., as described in connection with 1502 and 1602, to establish a first connection with a first base station; and a second connection component 1942 configured to establish a second connection with a second base station, e.g., as described in connection with 1504 and 1604. The communication manager 1932 includes an indication component 1944 that is configured, e.g., as described in connection with 1506, 1606, and 1608, to receive, via the reception component 1930, an indication, from the first base station or the second base station, indicating (e.g., implicitly) that at least one of the first base station or the second base station is to serve as an IAB donor for the IAB node; and to receive, from the first base station or the second base station, an assertion for at least a subset of IAB donor functionality.

The apparatus may include additional components that perform each of the blocks of the algorithm in the aforementioned flowcharts of FIGS. 15-16. As such, each block in the aforementioned flowcharts of FIGS. 15-16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for establishing a first connection with a first base station; means for establishing a second connection with a second base station; and means for receiving an indication, from the first base station, indicating that at least one of the first base station or the second base station is to serve as an IAB donor for the IAB node. The apparatus 1902 further includes means for receiving, from the first base station or the second base station, an assertion for at least a subset of IAB donor functionality.

The aforementioned means may be one or more of the aforementioned components of the apparatus 1902 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first base station, including:
establishing a first connection with an IAB node; transmitting, to a second base station, a request for the second base station to establish a second connection with the IAB node; and indicating to the second base station, based on the second connection being established with the IAB node, that at least one of the first base station or the second base station is to serve as an IAB donor for the IAB node.

Aspect 2 may be combined with aspect 1 and includes that the first connection is based on at least one of a first RRC connection or a first F1-C interface, and the second connection is based on at least one of a second RRC connection or a second F1-C interface.

Aspect 3 may be combined with any of aspects 1-2 and includes that the first connection and the second connection provide DC for the IAB node, the DC associated with at least one of NR-DC, MR-DC, a DAPS, or multi-MT connectivity.

Aspect 4 may be combined with any of aspects 1-3 and includes that the first base station indicates to the second base station that the first base station will serve as the IAB donor for the IAB node, the aspect further including indicating IAB donor functionality to the IAB node.

Aspect 5 may be combined with any of aspects 1-4 and includes that serving as the IAB donor for the IAB node includes at least one of: establishing a backhaul RLC channel with the IAB node, transmitting a BAP configuration to the IAB node, transmitting a cell resource configuration for a DU to the IAB node, transmitting an IP configuration to the IAB node, or terminating F1 connectivity with the IAB node.

Aspect 6 may be combined with any of aspects 1-5 and includes that the first base station indicates to the second base station that the second base station is to serve as the IAB donor for the IAB node.

Aspect 7 may be combined with any of aspects 1-6 and includes that the indication to the second base station further indicates that the second base station is to establish at least one of a c-plane connection or a u-plane connection with the IAB node via the first base station for serving as the IAB donor to the IAB node.

Aspect 8 may be combined with any of aspects 1-5 and includes that the first base station indicates to the second base station that the first base station is to serve as the IAB donor for the IAB node.

Aspect 9 may be combined with any of aspects 1-5 or 8 and includes that the indication to the second base station further indicates that the first base station is to establish at least one of a c-plane connection or a u-plane connection with the IAB node via the second base station for serving as the IAB donor to the IAB node, the c-plane connection being established in association with a control-plane-user-plane (CP-UP) separation procedure, the u-plane connection being established in association with a topological redundancy procedure.

Aspect 10 may be combined with any of aspects 1-9 and further includes receiving, from the second base station, a response that indicates whether the at least one of the first base station or the second base station is to serve as the IAB donor for the IAB node.

Aspect 11 may be combined with any of aspects 1-10 and includes that the first base station indicates to the second base station that the first base station and the second base station are to serve as IAB donors for the IAB node.

Aspect 12 may be combined with any of aspects 1-3 or 5-11 and includes that the first base station indicates to the second base station that the second base station is to provide a subset of IAB donor functionality for the IAB node.

Aspect 13 is a method of wireless communication at a second base station, including: receiving, from a first base station having a first connection with an IAB node, a request for the second base station to establish a second connection with the IAB node; receiving, from the first base station, based on the second connection being established with the IAB node, an indication that at least one of the first base station or the second base station is to serve as an IAB donor for the IAB node; and accepting or rejecting the indication received from the first base station that the at least one of the first base station or the second base station is to serve as the IAB donor for the IAB node.

Aspect 14 may be combined with aspect 13 and further includes establishing, based on the request, the second connection with the IAB node.

Aspect 15 may be combined with any of aspects 13-14 and includes that the first connection is based on at least one of a first RRC connection or a first F1-C interface, and the second connection is based on at least one of a second RRC connection or a second F1-C interface.

Aspect 16 may be combined with any of aspects 13-15 and includes that the first connection and the second connection provide DC for the IAB node, the DC associated with at least one of NR-DC, MR-DC, a DAPS, or multi-MT connectivity.

Aspect 17 may be combined with any of aspects 13-16 and includes that the second base station receives the indication that the second base station is to serve as the IAB donor for the IAB node, the aspect further including: indicating IAB donor functionality to the IAB node when the second base station is to serve as the IAB donor for the IAB node.

Aspect 18 may be combined with any of aspects 13-17 and includes that serving as the IAB donor for the IAB node includes at least one of: establishing a backhaul RLC channel with the IAB node, transmitting a BAP configuration to the IAB node, transmitting a cell resource configuration for a DU to the IAB node, transmitting an IP configuration to the IAB node, or terminating F1 connectivity with the IAB node.

Aspect 19 may be combined with any of aspects 13-18 and includes that the second base station receives the indication that the second base station is to serve as the IAB donor for the IAB node.

Aspect 20 may be combined with any of aspects 13-19 and includes that the indication received from the first base station further indicates to the second base station that the second base station is to establish at least one of a c-plane connection or a u-plane connection with the IAB node via the first base station for serving as the IAB donor to the IAB node.

Aspect 21 may be combined with any of aspects 13-18 and includes that the second base station receives the indication from the first base station indicating that the first base station is to serve as the IAB donor for the IAB node.

Aspect 22 may be combined with any of aspects 13-18 or 21 and includes that the indication received from the first base station further indicates that the first base station is to establish at least one of a c-plane connection or a u-plane connection with the IAB node via the second base station for serving as the IAB donor to the IAB node, the c-plane connection being established in association with a control-plane-user-plane (CP-UP) separation procedure, the u-plane connection being established in association with a topological redundancy procedure.

Aspect 23 may be combined with any of aspects 13-22 and includes that accepting or rejecting the indication further includes transmitting a response to the first base station that indicates whether the second base station will establish at least one of a c-plane connection or a u-plane connection with the IAB node via the first base station for serving as the IAB donor to the IAB node.

Aspect 24 may be combined with any of aspects 13-23 and includes that the indication received from the first base station indicates that the first base station and the second base station are to serve as IAB donors for the IAB node.

Aspect 25 may be combined with any of aspects 13-16 or 18-24 and includes that the indication received from the first base station indicates that the second base station is to provide a subset of IAB donor functionality for the IAB node.

Aspect 26 is a method of wireless communication at an IAB node, including: establishing a first connection with a first base station; establishing a second connection with a second base station; and receiving an indication, from the first base station or the second base station, that indicates at least one of the first base station or the second base station is to serve as an IAB donor for the IAB node.

Aspect 27 may be combined with aspect 26 and includes that the first connection is based on at least one of a first RRC connection or a first F1-C interface, and the second connection is based on at least one of a second RRC connection or a second F1-C interface.

Aspect 28 may be combined with any of aspects 26-27 and includes that the first connection and the second connection provide DC for the IAB node, the DC associated with at least one of NR-DC, MR-DC, a DAPS, or multi-MT connectivity.

Aspect 29 may be combined with any of aspects 26-28 and further includes receiving, from the first base station or the second base station, an assertion for at least a subset of IAB donor functionality.

Aspect 30 may be combined with any of aspects 26-29 and includes that serving as the IAB donor for the IAB node includes at least one of: establishing a backhaul RLC channel with the IAB node, transmitting a BAP configuration to the IAB node, transmitting a cell resource configuration for a DU to the IAB node, transmitting an IP configuration to the IAB node, or terminating F1 connectivity with the IAB node.

Aspect 31 may be combined with any of aspects 26-30 and includes that the IAB node receives the indication that the second base station is to serve as the IAB donor for the IAB node.

Aspect 32 may be combined with any of aspects 26-30 and includes that the IAB node receives the indication that the first base station is to serve as the IAB donor for the IAB node.

Aspect 33 may be combined with any of aspects 26-32 and includes that the IAB node receives the indication that the first base station and the second base station are to serve as IAB donors for the IAB node.

Aspect 34 may be combined with any of aspects 26-33 and includes that the IAB node receives the indication that the second base station is to provide a subset of IAB donor functionality for the IAB node.

Aspect 35 is an apparatus for wireless communication at a first base station including at least one processor coupled to a memory and configured to implement a method as in any of aspects 1-12.

Aspect 36 is an apparatus for wireless communication at a second base station including at least one processor coupled to a memory and configured to implement a method as in any of aspects 13-25.

Aspect 37 is an apparatus for wireless communication at an IAB node including at least one processor coupled to a memory and configured to implement a method as in any of aspects 26-34.

Aspect 38 is an apparatus for wireless communication at a first base station including means for implementing a method as in any of aspects 1-12.

Aspect 39 is an apparatus for wireless communication at a second base station including means for implementing a method as in any of aspects 14-25.

Aspect 40 is an apparatus for wireless communication at an IAB node including means for implementing a method as in any of aspects 27-34.

Aspect 41 is a computer-readable medium storing computer executable code, where the code when executed by a processor causes the processor to implement a method as in any of aspects 1-12.

Aspect 42 is a computer-readable medium storing computer executable code, where the code when executed by a processor causes the processor to implement a method as in any of aspects 14-25.

Aspect 43 is a computer-readable medium storing computer executable code, where the code when executed by a processor causes the processor to implement a method as in any of aspects 27-34.

What is claimed is:

1. An apparatus for wireless communication at a first base station capable of serving as an integrated access and backhaul (IAB) donor for an IAB node, comprising:
   a memory; and
   at least one processor coupled to the memory and configured to:
   establish a first connection with an IAB node;
   provide, to a second base station capable of serving as an IAB donor for an IAB node, a request for the second base station to establish a second connection with the IAB node for a dual connectivity (DC) mode of operation at the IAB node; and
   provide, to the second base station, based on the second connection having been established with the IAB node, an indication that the first base station and the second base station are to serve as IAB donors for the IAB node operating in the DC mode of operation.

2. The apparatus of claim 1, wherein the first connection is based on at least one of a first radio resource control (RRC) connection and a first F1-control (F1-C) interface.

3. The apparatus of claim 1, wherein the first connection and the second connection provide the DC for the IAB node, the DC associated with at least one of new radio-DC (NR-DC), multi-radio-DC (MR-DC), a dual active protocol stack (DAPS), and multi-mobile terminated (multi-MT) connectivity.

4. The apparatus of claim 1, wherein the at least one processor is further configured to:
   indicate IAB donor functionality to the IAB node.

5. The apparatus of claim 1, wherein to serve as the IAB donor for the IAB node the at least one processor is further configured to at least one of:
   establish a backhaul radio link control (RLC) channel with the IAB node,
   transmit a backhaul adaptation protocol (BAP) configuration to the IAB node,
   transmit a cell resource configuration for a distributed unit (DU) to the IAB node,
   transmit an internet protocol (IP) configuration to the TAB node, and
   terminate F1 connectivity with the IAB node.

6. The apparatus of claim 1, wherein the at least one processor is further configured to provide an additional indication to the second base station that the second base station is to serve as an additional IAB donor for the IAB node.

7. The apparatus of claim 1, wherein the at least one processor is further configured to provide an additional indication to the second base station that the first base station is to establish a control-plane (c-plane) connection with the IAB node via the second base station for serving as the IAB donor to the IAB node, the c-plane connection being established in association with a control-plane-user-plane (CP-UP) separation procedure.

8. The apparatus of claim 1, wherein the at least one processor is further configured to receive, from the second base station, a response to the indication that the first base station is to serve as the IAB donor for the IAB node.

9. The apparatus of claim 1, wherein the at least one processor is further configured to provide an additional indication to the second base station that the first base station and the second base station are to serve as IAB donors for the IAB node.

10. The apparatus of claim 1, wherein the at least one processor is further configured to provide an additional indication to the second base station that the second base station is to provide a subset of IAB donor functionality for the IAB node.

11. An apparatus for wireless communication at a second base station capable of serving as an integrated access and backhaul (IAB) donor for an IAB node, comprising:
  a memory; and
  at least one processor coupled to the memory and configured to:
    receive, from a first base station having a first connection with an IAB node, a request for the second base station to establish a second connection with the IAB node for a dual connectivity (DC) mode of operation at the IAB node;
    receive, from the first base station, based on the second connection having been established with the IAB node, an indication that the first base station and the second base station are to serve as IAB donors for the IAB node operating in the DC mode of operation; and
    accept or reject the indication received from the first base station that the first base station and the second base station are to serve as IAB donors for the IAB node.

12. The apparatus of claim 11, wherein the at least one processor is further configured to establish, based on the request, the second connection with the IAB node.

13. The apparatus of claim 11, wherein the first connection is based on a first F1-control (F1-C) interface.

14. The apparatus of claim 11, wherein the first connection and the second connection provide the DC for the IAB node, the DC associated with at least one of new radio-DC (NR-DC), multi-radio-DC (MR-DC), a dual active protocol stack (DAPS), and multi-mobile terminated (multi-MT) connectivity.

15. The apparatus of claim 11, wherein the at least one processor is further configured to:
  receive an additional indication that the second base station is to serve as the IAB donor for the IAB node; and
  indicate, based on the additional indication, IAB donor functionality to the IAB node.

16. The apparatus of claim 11, wherein to serve as the IAB donor for the IAB node the at least one processor is further configured to at least one of:
  establish a backhaul radio link control (RLC) channel with the IAB node,
  transmit a backhaul adaptation protocol (BAP) configuration to the IAB node,
  transmit a cell resource configuration for a distributed unit (DU) to the IAB node,
  transmit an internet protocol (IP) configuration to the IAB node, and
  terminate F1 connectivity with the IAB node.

17. The apparatus of claim 11, wherein the indication from the first base station further indicates that the first base station is to establish a control-plane (c-plane) connection with the IAB node via the second base station for serving as the IAB donor to the IAB node, the c-plane connection being established in association with a control-plane-user-plane (CP-UP) separation procedure.

18. The apparatus of claim 11, wherein, to accept or reject the indication, the at least one processor is further configured to transmit a response to the first base station that indicates whether the second base station will establish a control-plane (c-plane) connection with the IAB node via the first base station for serving as the IAB donor to the IAB node.

19. The apparatus of claim 11, wherein the indication from the first base station further indicates that the first base station and the second base station are to serve as IAB donors for the IAB node.

20. The apparatus of claim 11, wherein the indication from the first base station further indicates that the second base station is to provide a subset of IAB donor functionality for the IAB node.

21. A method of wireless communication at a first base station capable of serving as an integrated access and backhaul (IAB) donor for an IAB node, comprising:
  establishing a first connection with an IAB node;
  providing, to a second base station capable of serving as an IAB donor for an IAB node, a request for the second base station to establish a second connection with the LAB node for a dual connectivity (DC) mode of operation at the IAB node; and
  providing an indication to the second base station, based on the second connection having been established with the TAB node, that the first base station and the second base station are to serve as IAB donors for the TAB node operating in the DC mode of operation.

22. The apparatus of claim 10, wherein the at least one processor is further configured to provide a resource configuration for at least the IAB node and the subset of IAB donor functionality for the IAB node comprises at least one of configuring a backhaul radio link control (RLC) channel with the IAB node and transmitting a backhaul adaptation protocol (BAP) configuration to the IAB node.

23. The apparatus of claim 20, wherein the subset of IAB donor functionality for the IAB node comprises at least one of configuring a backhaul radio link control (RLC) channel with the IAB node and transmitting a backhaul adaptation protocol (BAP) configuration to the IAB node and wherein the subset of IAB donor functionality for the IAB node does not comprise providing a resource configuration for the IAB node.

24. The method of claim 21, wherein the first connection and the second connection provide the DC for the IAB node, the DC associated with at least one of new radio-DC (NR-DC), multi-radio-DC (MR-DC), a dual active protocol stack (DAPS), and multi-mobile terminated (multi-MT) connectivity.

25. The method of claim 21, wherein serving as the IAB donor for the IAB node further comprises at least one of:
  establishing a backhaul radio link control (RLC) channel with the IAB node,
  transmitting backhaul adaptation protocol (BAP) configuration to the IAB node,
  transmitting a cell resource configuration for a distributed unit (DU) to the IAB node,
  transmitting an internet protocol (IP) configuration to the IAB node, and
  terminating F1 connectivity with the IAB node.

26. The method of claim 21, further comprising providing an additional indication to the second base station that the second base station is to serve as an additional IAB donor for the IAB node.

27. The method of claim 21, further comprising providing an additional indication to the second base station that the first base station is to establish a control-plane (c-plane)

connection with the IAB node via the second base station for serving as the IAB donor to the IAB node, the c-plane connection being established in association with a control-plane-user-plane (CP-UP) separation procedure.

28. The method of claim 21, further comprising receiving, from the second base station, a response to the indication that the first base station is to serve as the IAB donor for the IAB node.

29. The method of claim 21, further comprising providing an additional indication to the second base station that the first base station and the second base station are to serve as IAB donors for the IAB node.

30. The method of claim 21, further comprising:
providing an additional indication to the second base station that the second base station is to provide a subset of IAB donor functionality for the IAB node, wherein the subset of IAB donor functionality for the IAB node comprises at least one of configuring a backhaul radio link control (RLC) channel with the IAB node and transmitting a backhaul adaptation protocol (BAP) configuration to the IAB node; and
providing a resource configuration for at least the IAB node.

\* \* \* \* \*